(12) United States Patent
Kimura et al.

(10) Patent No.: US 7,654,927 B2
(45) Date of Patent: Feb. 2, 2010

(54) TRANSMISSION APPARATUS

(75) Inventors: Katsumi Kimura, Tokyo (JP); Toshio Miwa, Tokyo (JP); Michio Takashima, Tokyo (JP); Ken Usami, Tokyo (JP); Kazuhiko Sugiyama, Tokyo (JP)

(73) Assignee: Ebara Corporation, Tokyo (JP)

( * ) Notice: Subject to any disclaimer, the term of this patent is extended or adjusted under 35 U.S.C. 154(b) by 22 days.

(21) Appl. No.: 11/907,038

(22) Filed: Oct. 9, 2007

(65) Prior Publication Data

US 2008/0274850 A1 Nov. 6, 2008

Related U.S. Application Data

(62) Division of application No. 10/505,010, filed as application No. PCT/JP03/02083 on Feb. 25, 2003, now Pat. No. 7,297,084.

(30) Foreign Application Priority Data

| Feb. 25, 2002 | (JP) | ............................... 2002-47808 |
| Feb. 25, 2002 | (JP) | ............................... 2002-47826 |

(51) Int. Cl.
*F16H 37/06* (2006.01)
(52) U.S. Cl. ............................... 475/5; 475/47; 475/52; 475/53; 475/59
(58) Field of Classification Search ............... 475/5, 475/47, 48, 50, 52, 53, 59; 180/65.2, 65.21, 180/65.22, 65.225, 65.235
See application file for complete search history.

(56) References Cited

U.S. PATENT DOCUMENTS

| 2,968,197 A | 1/1961 | De Lorean |
| 3,023,639 A | 3/1962 | Hellmut et al. |
| 3,065,652 A | 11/1962 | Kugel et al. |
| 3,105,393 A | 10/1963 | Hellmut |
| 3,180,180 A | 4/1965 | Helfer et al. |
| 3,299,743 A | 1/1967 | Stockton |
| 3,939,731 A | 2/1976 | Ranzi |
| 4,147,075 A | 4/1979 | Rasman et al. |
| 4,259,881 A | 4/1981 | Meyerle |

(Continued)

FOREIGN PATENT DOCUMENTS

DE 3903876 C1 9/1990

(Continued)

OTHER PUBLICATIONS

The international Preliminary Examination Report issued by WIPO on Oct. 28, 2004.

(Continued)

*Primary Examiner*—David D Le
(74) *Attorney, Agent, or Firm*—Westerman, Hattori, Daniels & Adrian, LLP

(57) ABSTRACT

The present invention relates to a transmission apparatus (15) including at least one of a dividing unit (6) and a differential planetary gear unit (30), and a joint unit (20). A rotational power, which has been input to the transmission apparatus (15), is transmitted to the joint unit (20) via the dividing unit (6) or the differential planetary gear unit (30). A rotational power to be input to the joint unit (20) is smaller than the rotational power which has been input to the transmission apparatus (15), and the joint unit comprises a fluid coupling.

6 Claims, 21 Drawing Sheets

U.S. PATENT DOCUMENTS

| | | | |
|---|---|---|---|
| 4,615,239 A | 10/1986 | Hirt et al. | |
| 4,726,255 A | 2/1988 | Humpfer et al. | |
| 4,836,049 A | 6/1989 | Moan | |
| 5,117,931 A | 6/1992 | Nishida | |
| 5,931,757 A * | 8/1999 | Schmidt | 475/2 |
| 6,461,266 B1 * | 10/2002 | Weisz | 475/5 |
| 6,793,600 B2 * | 9/2004 | Hiraiwa | 475/5 |

FOREIGN PATENT DOCUMENTS

| | | |
|---|---|---|
| JP | 52-8460 | 3/1977 |
| JP | 53-129765 | 11/1978 |
| JP | 57-129931 | 8/1982 |
| JP | 60-185699 | 9/1985 |
| JP | 62-233544 | 10/1987 |
| JP | 63-147666 | 9/1988 |
| JP | 01-188759 | 7/1989 |
| JP | 02-190649 | 7/1990 |
| JP | 03-107653 | 5/1991 |
| JP | 03260421 A | 11/1991 |
| JP | 3-273933 | 12/1991 |
| JP | 09-14176 | 1/1997 |
| JP | 10-331946 | 12/1998 |
| JP | 11-82649 | 3/1999 |

OTHER PUBLICATIONS

Art. 153(7) EPC Supplemental European Search Report in EP 03 70 7072, issued on Apr. 3, 2008, Issued in English.

* cited by examiner

F I G. 5
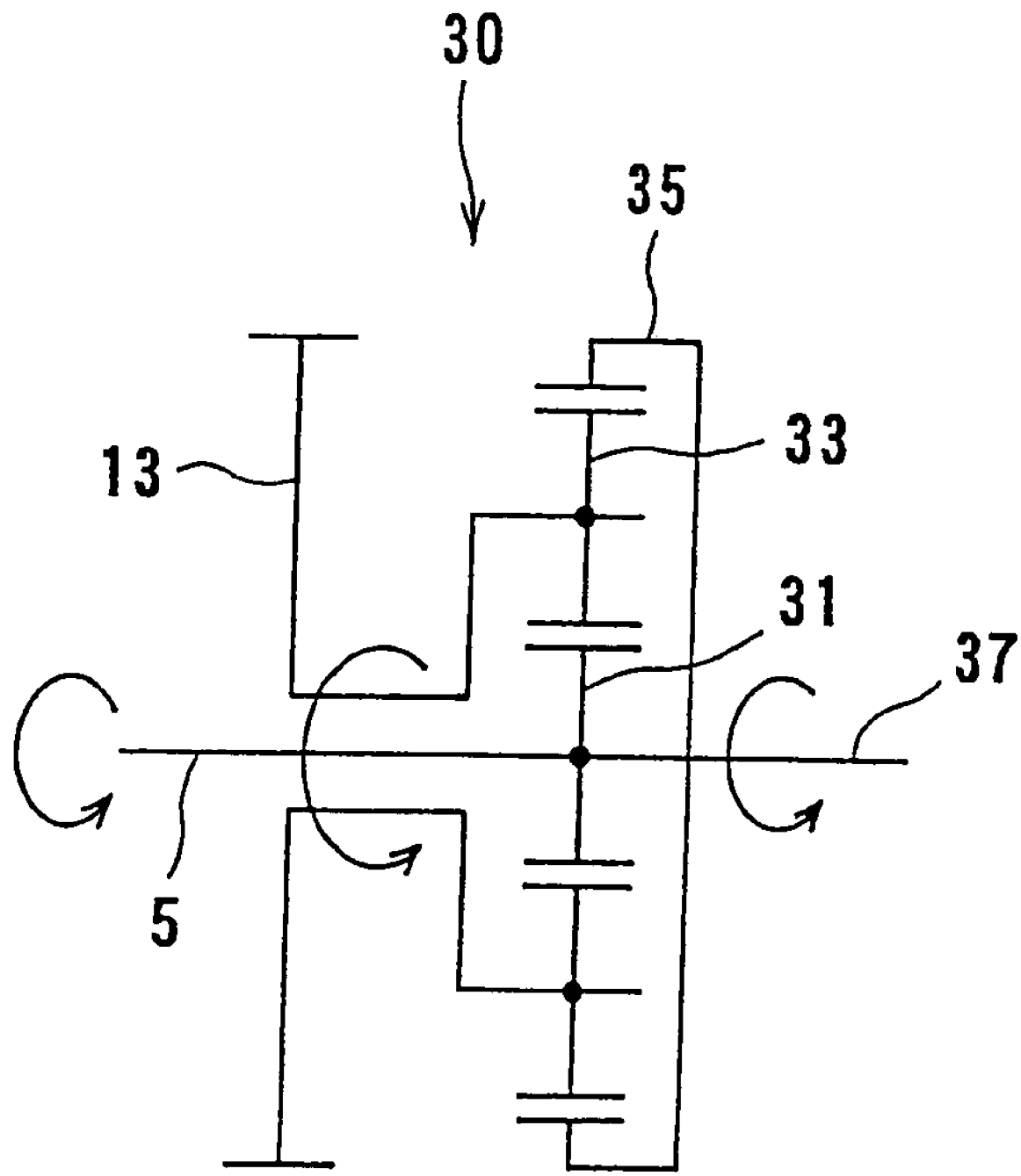

TRANSMISSION APPARATUS

This application is a divisional application of U.S. Ser. No. 10/505,010, filed Aug. 19, 2004, now U.S. Pat. No. 7,297,084 which is a national stage of PCT/JP03/02083, filed Feb. 25, 2003.

TECHNICAL FIELD

The present invention relates to a transmission apparatus having a dividing unit to which a rotational power from a drive unit is transmitted, a joint unit, and a first differential planetary gear unit, and specifically to a transmission apparatus used to rotate a fluid machinery such as a turbo machinery by a drive unit such as a motor for synchronizing a drive side and a driven side with each other, relieving an impact that occurs at starting/stopping or at changing in a rotational speed, and achieving an efficient transmission of a rotational power.

BACKGROUND ART

In a conventional apparatus shown in FIG. 22, an output shaft C4 of an electric motor A1 serving as a drive source is connected to an input side of a driven unit A2 such as a fluid machinery via a joint A22 and an output shaft C7. In this case, transmission of a rotational power from the electric motor A1 is limited to a range in which the joint A22 can transmit the rotational power.

At the same time, there is a need to transmit a rotational power beyond the range in which the joint A22 can transmit the rotational power.

In order to meet such a need, as shown in FIGS. 23A and 23B, there has been proposed a transmission apparatus A15 which distributes or divides a rotational power that is input from a drive source A1.

According to the transmission apparatus A15 shown in FIGS. 23A and 23B, the rotational power from the drive source A1 is distributed to a power line R1 and a power line R2 by a dividing unit 6, so that the rotational power below the transmission limit of a continuously variable transmission A20 is distributed to the power line R1 and the residual rotational power is distributed to the power line R2.

The rotational powers divided by the dividing unit 6 are converged by a differential planetary gear unit A30 disposed at an output side of the continuously variable transmission A20, so that the converged rotational power is transmitted to a driven unit A2 via a single output shaft 37.

With this structure, the rotational power beyond the transmission limit of the continuously variable transmission A20 can be transmitted to the driven side.

However, the continuously variable transmission A20 shown in FIGS. 23A and 23B employs a mechanism of a toroidal-type continuously variable transmission (CVT). Since the toroidal-type CVT is of a contact type, there are limits to a maximum transmission power and a service life. Therefore, it is difficult to apply the toroidal-type CVT to a large equipment which is required to transmit a large power, and to an industrial machinery which is required to have a reliability.

Further, various kinds of vibrations and impacts, such as pulsation due to power fluctuation, shock vibration at speed change, and torsion vibration of the output shaft, are transmitted or occur to an output side of the toroidal-type CVT. Accordingly, the toroidal-type CVT, which utilizes solid friction, is problematic in output fluctuation and durability because of such vibrations and impacts.

In addition, another type of conventional transmission apparatus has the same problems.

DISCLOSURE OF INVENTION

The present invention has been made in view of the above drawbacks. It is therefore an object of the present invention to provide a transmission apparatus which can efficiently transmit a rotational power beyond a transmission limit of a joint unit, and can absorb various kinds of vibrations and impacts, such as pulsation, shock vibration at speed change, and torsion vibration of an output shaft, for thereby enabling an increase in service life and power transmission limit.

A transmission apparatus according to the present invention comprises: at least one of a dividing unit (6) and a differential planetary gear unit (30); and a joint unit (20); wherein a rotational power to be transmitted via the joint unit (20) is smaller than a rotational power (i.e., a rotational power of a drive unit) which has been input to the transmission apparatus, and the joint unit (20) comprises a fluid coupling.

In the transmission apparatus according to the present invention, the rotational power which has been input to the transmission apparatus is transmitted to the dividing unit (6) via a single input shaft and is output to two rotating shafts, one of the two rotating shafts is connected to one of two input shafts of the differential planetary gear unit (30), and the other of the two rotating shafts is connected to the other of the two input shafts of the differential planetary gear unit (30) via the fluid coupling (20).

FIGS. 24A through 24D schematically illustrate the manner in which a power is transmitted from a drive unit A1 to a driven unit A2. For, example, in FIG. 24A, a power P from the drive unit A1 is divided by a dividing unit (distribution gears) 6. A power P1, which is one of the divided powers, is transmitted to a differential planetary gear unit A30 via a power line R1. A power P2, which is the other of the divided powers, is transmitted to the differential planetary gear unit A30 via a continuously variable transmission A20 and a power line R2. The power P1 and the power P2 are joined together again in the differential planetary gear unit A30 and then transmitted to the driven unit A2.

FIGS. 24A and 24B illustrate the manner of power distribution, and FIGS. 24C and 24D illustrate the manner of power circulation. In FIGS. 24A through 24D, magnitude of the power flow due to action of the differential planetary gear unit A30 is expressed by a width of a white arrow. The power distribution means the manner in which the power from the input side is divided by the distribution gears and the divided powers are transmitted through two paths and then joined together by the differential planetary gear to flow into the output side. The power transmitted through one of two distribution shafts is larger than the power transmitted through the other of the distribution shafts. On the other hand, the power circulation means the manner in which the power from the input side flows only into one of the distribution gears and flows into the output side via the differential planetary gear (hereinafter, a shaft through which the power is transmitted will be referred to as a shaft A). Specifically, as shown in FIGS. 24C and 24D, there exists a power flow circulating in the order of the differential planetary gear→the distribution gears→the continuously variable transmission→the differential planetary gear. In this case, the powers flowing through the shaft A are joined together and the joined power becomes larger than the input power. The power flowing through the other shaft becomes small and its flow direction is reversed.

FIGS. 24B and 24C schematically illustrate the power transmission manner of the present invention. The magnitude of the power flow of the power line R2 passing through the continuously variable transmission A20 is smaller than the input power.

Specifically, "the rotational power to be transmitted via the joint unit (20) is smaller than the rotational power which has been input to the transmission apparatus", which is an essential element of the present invention, means the manner in which the magnitude of the power flow of the power line R2 passing through the continuously variable transmission A20 is smaller than the input power, as shown in FIGS. 24B and 24C. The present invention uses a fluid coupling as the continuously variable transmission.

It is preferable that the fluid coupling comprises a variable-speed fluid coupling. According to the transmission apparatus of the present invention having such a structure, the rotational power beyond the transmission limit of the joint unit is not input to the joint unit, and hence the rotational power can be transmitted efficiently. Further, the fluid coupling can absorb various kinds of vibrations and impacts, such as pulsation of the input rotational power, shock due to speed change, and torsion vibration of the shaft, thus enabling a smooth transmission of the power.

In the transmission apparatus according to the present invention, the rotational power which has been input to the transmission apparatus is transmitted to the dividing unit (6) via a single input shaft (15a) and is output to two rotating shafts (4, 9), one (9) of the two rotating shafts (4, 9) is connected to one (13) of two input shafts (13, 5) of the differential planetary gear unit (30), and the other (4) of the two rotating shafts (4, 9) is connected to the other (5) of the two input shafts (13, 5) of the differential planetary gear unit (30) via the fluid coupling (20).

With such a structure, even if the power, which is input to the transmission apparatus, exceeds the transmission limit of the joint unit, the input power is divided into two by the dividing unit, so that one of the divided powers, which is below the transmission limit, is distributed to the fluid coupling and the other is directly distributed to the differential planetary gear unit. Accordingly, the transmission apparatus can transmit the power that is beyond the transmission limit of the fluid coupling.

In the transmission apparatus according to the present invention, the rotational power which has been input to the transmission apparatus is transmitted to the differential planetary gear unit (30B) via a single input shaft (15b) (of the dividing unit) and is transmitted to two output shafts (13b, 4b) of the differential planetary gear unit (30B), one (a direct-coupling shaft 13b) of the two output shafts of the differential planetary gear unit (30B) is connected to one (9b) of two input shafts of a converging unit (6B), and the other (4b) of the two output shafts of the differential planetary gear unit (30B) is connected to the other (37b) of the two input shafts of the converging unit (6B) via the fluid coupling (20).

According to the transmission apparatus of the present invention having such a structure, the input power is divided into two by the differential planetary gear unit, so that one of the divided powers, which is below the transmission limit, is distributed to the fluid coupling and the other is directly distributed to the dividing unit. Accordingly, the transmission apparatus can transmit the power that is beyond the transmission limit of the fluid coupling.

It is preferable that a gear unit (52d, 53d) having a speed-increasing gear and a speed-decreasing gear is provided on at least one of an input shaft (9, 5) and an output shaft (37d) of the differential planetary gear unit.

With such a structure, while keeping a rotational speed or a torque that is input to the transmission apparatus constant, the rotational speed or the torque that is output to the driven unit can be freely adjusted to an efficient value.

A transmission apparatus according to the present invention comprises: a dividing unit to which a rotational power from a drive unit is transmitted; a joint unit; and a first differential planetary gear unit; wherein one rotational power to be transmitted via the joint unit is smaller than the other rotational power, and the joint unit comprises an electric motor and a second differential planetary gear unit.

A transmission apparatus according to the present invention comprises: at least one of a dividing unit and a first differential planetary gear unit; and a joint unit; wherein a rotational power from a drive unit is divided into at least two rotational powers by the dividing unit or the first differential planetary gear unit, one of the rotational powers is input to the joint unit, the rotational power to be input to the joint unit is smaller than the other of the rotational powers, and the joint unit comprises an electric motor and a second differential planetary gear unit.

In the transmission apparatus according to the present invention, the rotational power from the drive unit is transmitted to the dividing unit via a single input shaft of the dividing unit and is output from the dividing unit to two rotating shafts, one of the two rotating shafts is connected to one of two input shafts of the first differential planetary gear unit, and the other of the two rotating shafts is connected to the other of the two input shafts of the first differential planetary gear unit.

In the transmission apparatus according to the present invention, the rotational power from the drive unit is transmitted to a single input shaft of the first differential planetary gear unit, one of two output shafts of the first differential planetary gear unit is connected to one of two input shafts of a converging unit, and the other of the two output shafts of the first differential planetary gear unit is connected to the other of the two input shafts of the converging unit via the second differential planetary gear unit.

In the transmission apparatus according to the present invention, the second differential planetary gear unit has a single-pinion-type structure in which one planetary gear is arranged in a radial direction and one or more planetary gears are arranged in a circumferential direction in a region between a sun gear and a ring gear, and each of the drive unit, the electric motor, and a load is directly connected to any one of an input shaft, an output shaft, and a speed-change shaft.

Accordingly, since the power from the drive unit is transmitted to the load without passing through the joint unit, a capacity of the joint unit can be small even in a case of operating a large machinery. Further, since the joint unit comprises the differential planetary gear unit having no frictional part but having a mechanically coupling structure, the long service life can be achieved and the transmission limit can become sufficiently high.

In order to clarify the effect of the present invention, first, there will be illustrated a flow of the rotational power transmitted by a combination of the dividing unit 6, a speed-change device, i.e., the joint unit R, and the differential planetary gear unit G, with reference to FIGS. 18 through 21. The dividing unit 6 is connected to an input shaft I. One of power flows that are output from the dividing unit 6 is input to a shaft R2 of the differential planetary gear unit G through the joint unit R, and the other is input to another shaft R1 of the differential planetary gear unit G. The power flows are then output from an output shaft O.

When the power flow, which is represented by a reference sign P, of the input shaft I is divided into P1 and P2 by the dividing unit 6, the power flow of the output shaft is P on the assumption that there is no loss. Magnitude of the power flow is expressed by a width of a white arrow.

It is preferable that the power flow passing through the joint unit R is as small as possible, and hence it can be said that the manner shown in FIGS. 19 and 20 is preferable. Specifically, "the rotational power to be transmitted via the joint unit is smaller than the rotational power which has been input to the transmission apparatus", which is an essential element of the present invention, means the manner in which the magnitude of the power flow of the power line R2 passing through the joint unit R is smaller than the input power, as shown in FIGS. 19 and 20.

BRIEF DESCRIPTION OF DRAWINGS

FIG. 5 is a view showing a differential planetary gear unit;

BEST MODE FOR CARRYING OUT THE INVENTION

Figure 1:
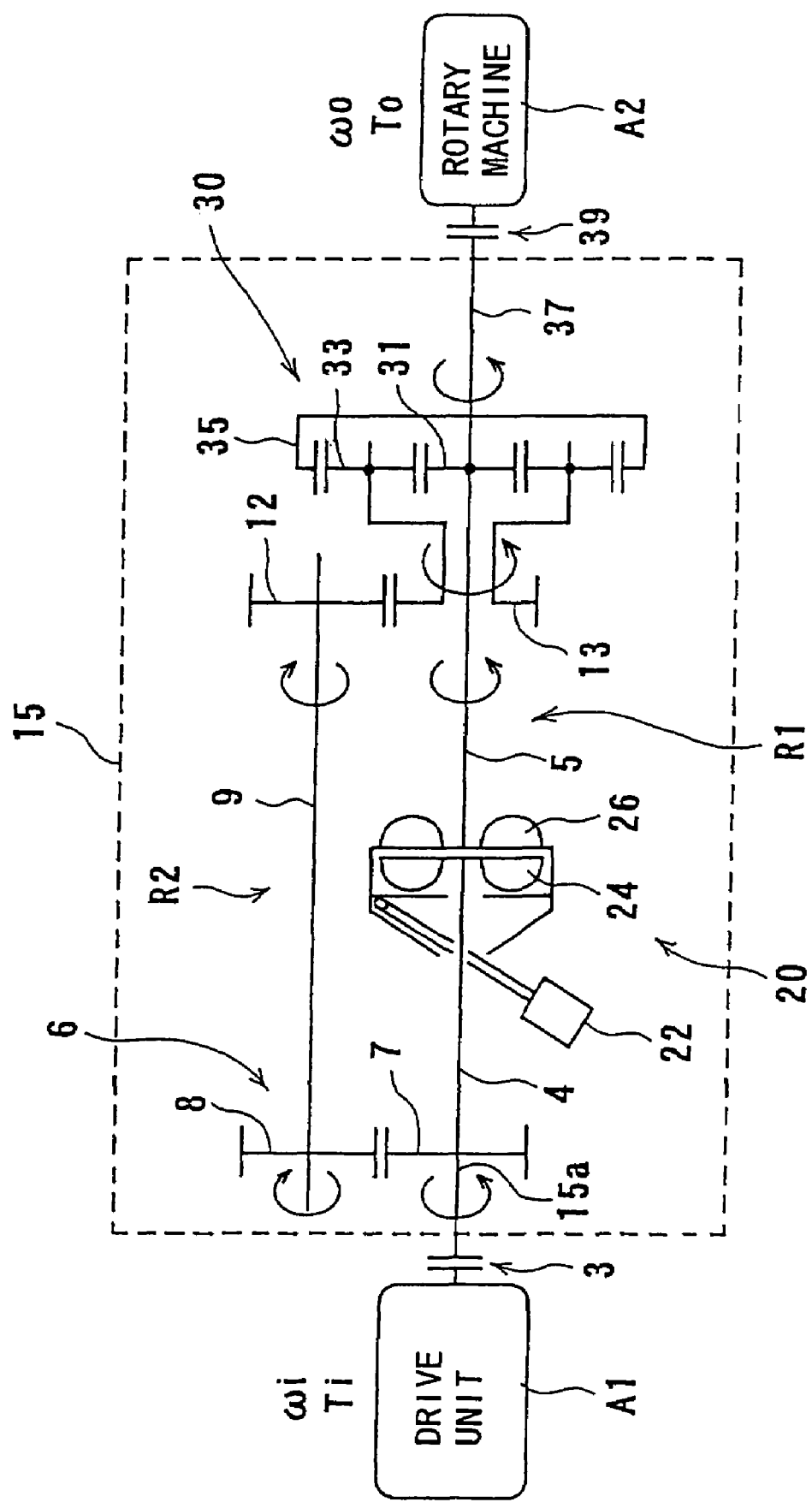
FIG. 1 is a view showing a transmission apparatus according to a first embodiment of the present invention.
Figure 2:
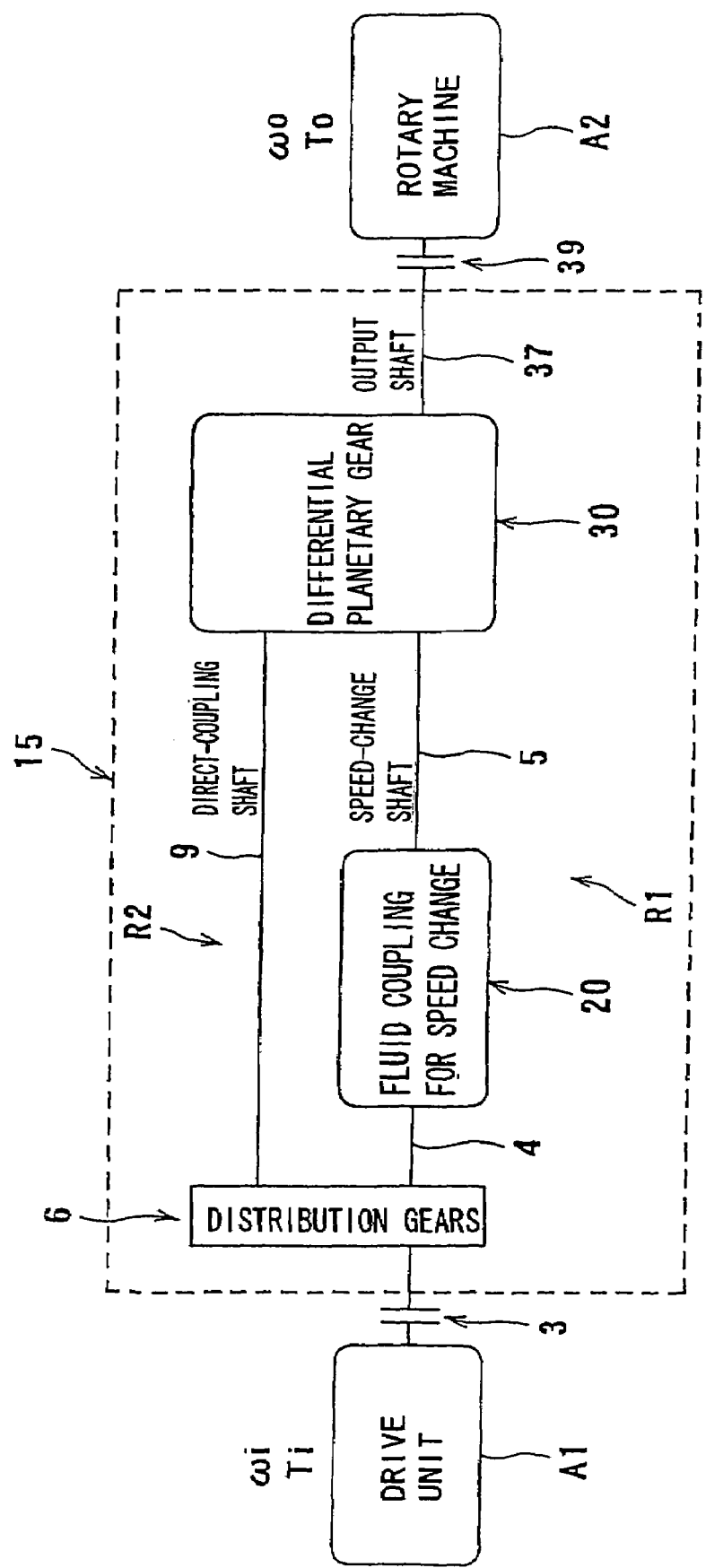
FIG. 2 is a block diagram schematically showing the transmission apparatus in FIG. 1.
Figure 23A:
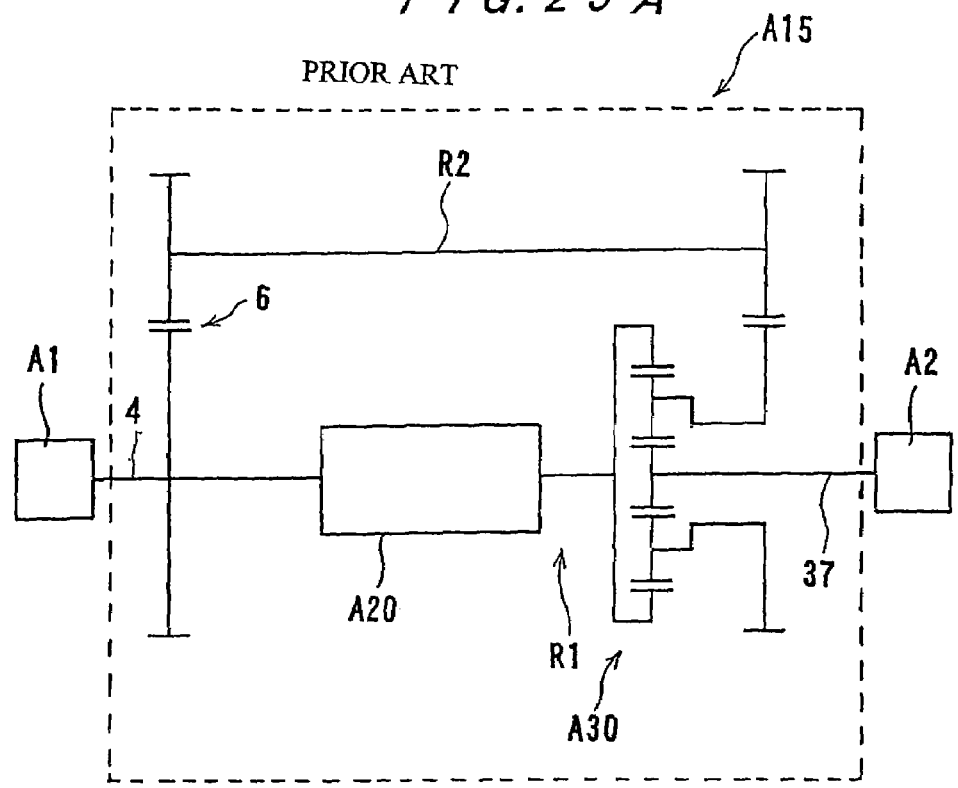
FIG. 23A is a view illustrating a conventional transmission apparatus.
Figure 23B:
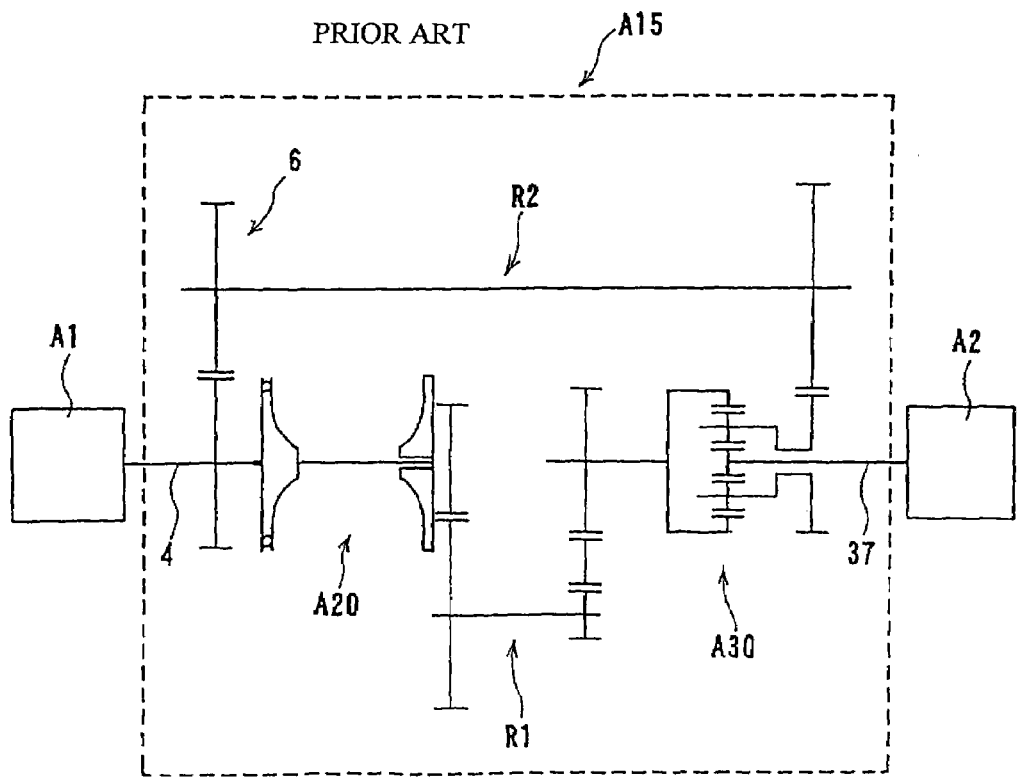
FIG. 23B is a view showing a power-dividing unit, a continuously variable transmission, and a differential planetary gear unit of a conventionally proposed transmission apparatus.
Figure 24A:
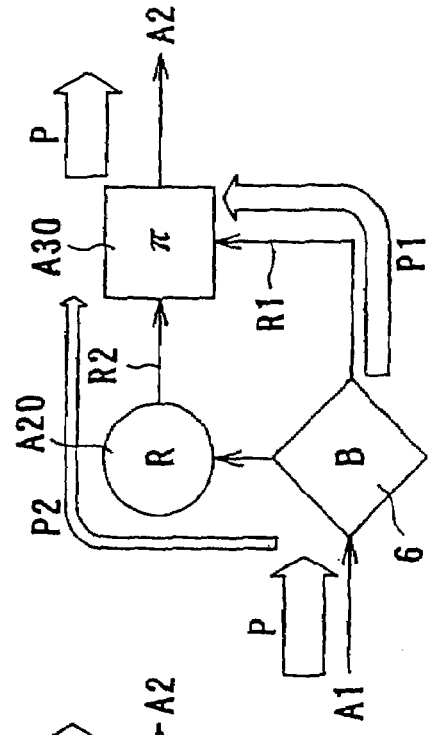
FIGS. 24A through 24D are schematic views illustrating the manner in which a power is transmitted from a drive unit to a driven unit.
Figure 24B:
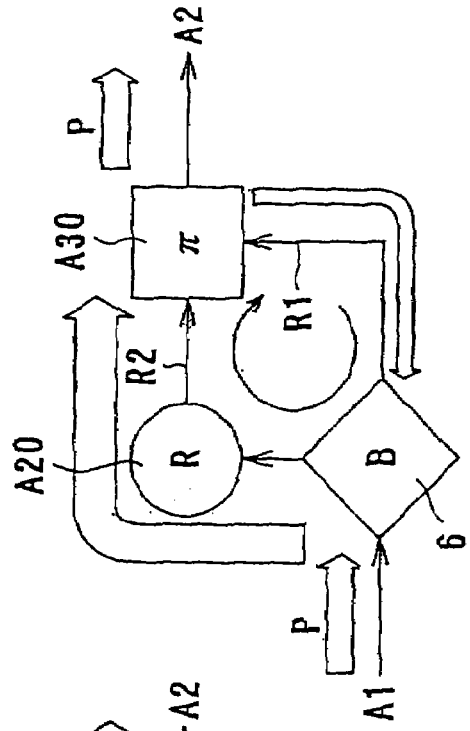
Figure 24C:
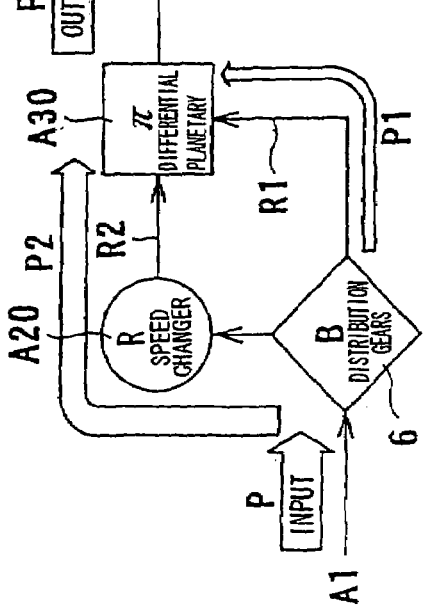
Figure 24D:
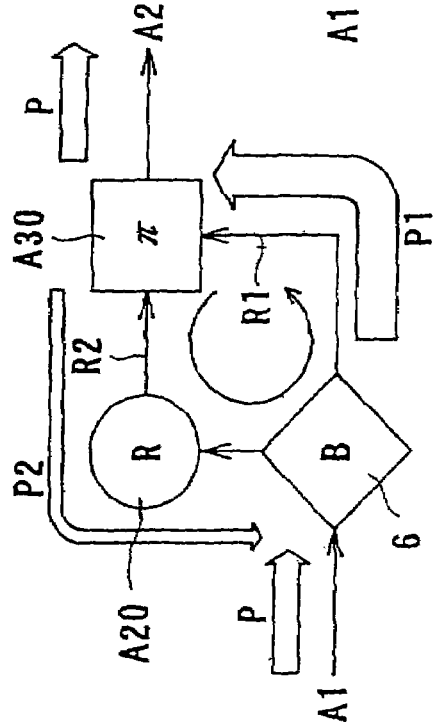

FIGS. 1 and 2 show a first embodiment of the present invention. FIG. 1 is a schematic view showing a detailed structure of a transmission apparatus of the present invention, and FIG. 2 is a block diagram schematically showing the transmission apparatus. Those parts which are denoted by the same reference numerals as those of the conventional apparatus shown FIG. 23 have identical structure and function.

In FIGS. 1 and 2, a transmission apparatus 15 is disposed between a motor A1 (expressed as a drive unit A1 in FIG. 1) serving as a drive source and a fluid machinery A2 (expressed as a rotary machine A2 in FIG. 1) serving as a driven unit. The transmission apparatus 15 is coupled to the motor A1 and the fluid machinery A2 via an input-side clutch 3 and an output-side clutch 39.

The transmission apparatus 15 comprises a power-dividing unit 6, a fluid coupling 20 for speed change, and a differential planetary gear unit 30, each of which serves as an essential part thereof.

The power-dividing unit 6 divides a rotational power of a rotating input shaft 15a connected to the input-side clutch 3 into two and distributes the divided rotational powers to a rotating shaft 4, which is directly connected to the rotating input shaft 15a, and to a rotating shaft 9 via gears 7 and 8. A power line via the rotating shaft 4 serves as a power line R1, and a power line via the rotating shaft 9 serves as a power line R2. There are two cases in the direction of the power transmission of the power line R1: One is that the power is transmitted from the rotating shaft 4 to the rotating shaft 5 via the fluid coupling 20, and the other is that the power is transmitted from the rotating shaft 5 to the rotating shaft 4 via the fluid coupling 20.

In the latter case, the fluid coupling 20 comprises an operating device 22, a drive pump 26, and a driven turbine 24, and is constructed so as to transmit the power from the rotating shaft 5 to the rotating shaft 4.

The differential planetary gear unit 30 comprises a sun gear 31, pinion gears 33, and a ring gear 35, as with a known structure. The sun gear 31 which is directly connected to the rotating shaft 5, and a carrier 13 which couples the rotating shaft 9 to the pinion gears 33 via a gear 12 serve as input shafts, respectively, and the ring gear 35 serves as an output shaft. The ring gear 35 is connected to the fluid machinery A2 via a rotating shaft 37 and the output-side clutch 39.

Figure 3:
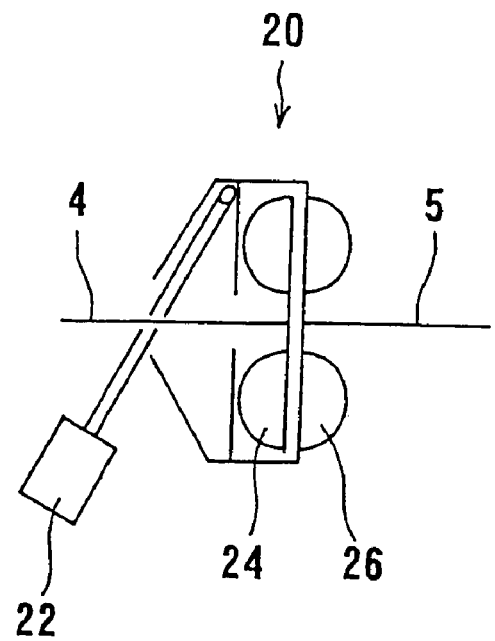
FIG. 3 is a view showing a fluid coupling having an operating device (scoop tube) disposed at a power input side.
Figure 4:
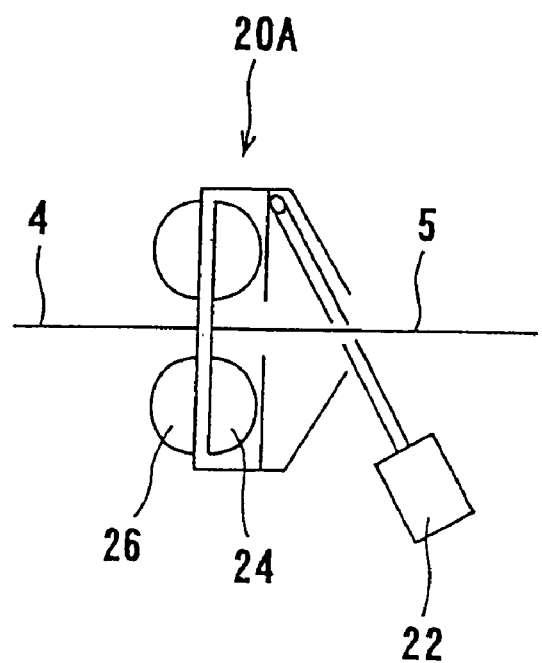
FIG. 4 is a view showing the fluid coupling having the operating device (scoop tube) disposed at a power output side.

FIG. 3 shows the fluid coupling 20 having a structure in which a power aspect (i.e., a rotational speed and a torque) to be transmitted to the rotating shaft 4 directly connected to the turbine 24 is operated by the operating device 22 which controls a rotational speed of the pump 26 directly connected to the rotating shaft 5. FIG. 4 shows a structure in which the power aspect to be transmitted to the rotating shaft 5 is operated by the operating device 22 which controls a circulating flow between the pump 26, which is directly connected to the rotating shaft 4, and the turbine 24.

The fluid coupling 20 shown in FIG. 3 is the type that is used in the transmission apparatus 15 of the first embodiment.

FIG. 5 shows a structure of the differential planetary gear unit 30. In the first embodiment, the sun gear 31 connected to the rotating shaft 5 serves as the input shaft, and the carrier 13 rotatably supporting the pinion gears 33 and connected to the rotating shaft 9 also serves as the input shaft. The ring gear 35 serves as the output shaft. It is known that the differential planetary gear unit has six permutations of input-output patterns that are made by a combination of the sun gear 31, the carrier 13, and the ring gear 35. Specifically, the number of permutations of the elements comprising the sun gear 31, the carrier 13, and the ring gear 35, two input shafts (i.e., the direct-coupling shaft 9 (see FIG. 2) without passing through the speed-change device and the speed-change shaft 5 passing through the speed-change device), and one output shaft 37 of the differential planetary gear unit is six given by 3!.

Operation of the transmission apparatus 15 having the above-mentioned structure will be described below.

First, a rotational power having a torque Ti and a rotational speed ωi is transmitted from the motor A1 serving as a drive source to the rotating input shaft 15a of the transmission apparatus 15 via the input-side clutch 3. The rotating input shaft 15a transmits the rotational power to the power-dividing unit 6. The power-dividing unit 6 distributes the rotational power to the rotating shaft 4 of the power line R1 and the rotating shaft 9 of the power line R2. At this time, the distribution of the rotational power to the rotating shaft 4 is limited to such a degree that a torque is below a transmission limit defined by an absorption capability of the fluid coupling 20 while a rotational speed is ωi. The rotational power distributed to the rotating shaft 9 has the rotational speed ωi and a residual torque if the power-dividing unit 6a has a gear ratio of 1. It is preferable that the torque to be distributed to the fluid coupling 20 is selected such that an efficient transmission is achieved while the torque is kept below the transmission limit.

The rotational power of the rotating shaft 9 is transmitted to the carrier 13 via the gear 12. On the other hand, the rotational power of the rotating shaft 4 is changed in speed and torque by the fluid coupling 20 and transmitted to the sun gear 31 of the differential planetary gear unit 30.

The rotational powers transmitted to the carrier 13 and the sun gear 31 are transmitted from the ring gear 35 to the fluid machinery A2 via the rotating shaft 37 and the output-side clutch 39. At this time, the rotational power transmitted to the fluid machinery A2 has a rotational speed ωo and a torque To. Assuming that there is no power transmission loss in the transmission apparatus 15, the following relation holds: ωi×Ti=ωo×To In this manner, the rotational power from the motor A1 is divided into two and distributed to the power line R1 passing through the fluid coupling 20 and the branched power line R2, and the divided rotational powers are joined together again by the differential planetary gear unit 30, so that the transmission apparatus 15 transmits the rotational power that is beyond the rotational power limit of the fluid coupling 20.

Figure 6:
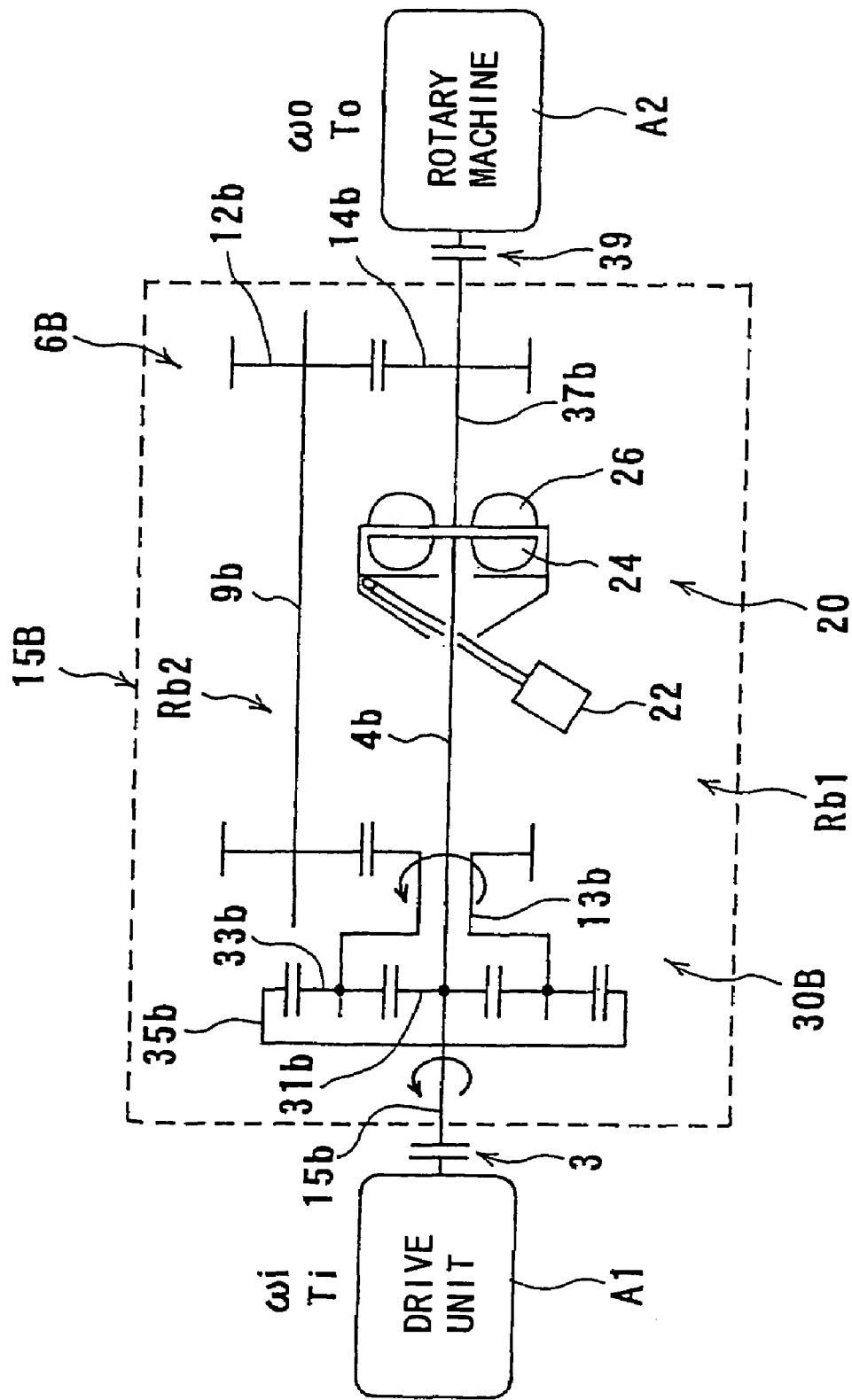
FIG. 6 is a view showing a transmission apparatus according to a second embodiment of the present invention.

FIG. 6 shows a second embodiment of the present invention. Those parts which are different from those of the first embodiment shown in FIGS. 1 and 2 will be mainly described below. Those parts which are denoted by the same reference numerals as those shown FIG. 1 have identical structure and function.

In FIG. 6, a transmission apparatus 15B is disposed between a motor A1 (expressed as a drive unit A1 in FIG. 6) serving as a drive source and a fluid machinery A2 (expressed as a rotary machine A2 in FIG. 6) serving as a driven unit. The transmission apparatus 15B is coupled to the motor A1 and the fluid machinery A2 via an input-side clutch 3 and an output-side clutch 39.

The transmission apparatus 15B comprises a differential planetary gear unit 30B, a fluid coupling 20 for speed change, and a power converging unit 6B, each of which serves as an essential part thereof.

The differential planetary gear unit 30B comprises a sun gear 31b, pinion gears 33b, and a ring gear 35b, as with a known structure. The ring gear 35b directly connected to a rotating shaft 15b serves as an input shaft, and a carrier 13b connected to a rotating shaft 9b and a rotating shaft 4b connected to the sun gear 31b serve as output shafts, respectively.

The fluid coupling 20 comprises an operating device 22, a drive pump 26, and a driven turbine 24, and is constructed so as to transmit the power from the rotating shaft 4b to the rotating shaft 37b.

The power converging unit 6B has a converging function instead of a dividing function of the above-mentioned power-dividing unit 6. The power converging unit 6B serves to converge the rotational power from the rotating shaft 9b and the rotational power from the fluid coupling 20 on the rotating shaft 37b.

A power line via the rotating shaft 4b serves as a power line Rb1, and a power line via the rotating shaft 9b serves as a power line Rb2.

Operation of the transmission apparatus 15B having the above-mentioned structure will be described below.

First, a rotational power having a torque Ti and a rotational speed ωi is transmitted from the motor A1 serving as a drive source to the rotating input shaft 15b and the ring gear 35b of the differential planetary gear unit 30B via the input-side clutch 3. The rotational power transmitted to the ring gear 35b is divided into two and distributed to the carrier 13b and the sun gear 31b. The divided rotational powers are transmitted to the rotating shaft 9b of the power line Rb2 and the rotating shaft 4b of the power line Rb1. The rotational power transmitted to the rotating shaft 4b is changed in speed and torque by the fluid coupling 20 and transmitted to the rotating shaft 37b serving as an input shaft of the power converging unit 6B.

On the other hand, the rotational power from the rotating shaft 9b is also transmitted to the rotating shaft 37b where the power line Rb2 and the power line Rb1 are joined together and transmitted to the fluid machinery A2 via the output-side clutch 39. At this time, the rotational power transmitted to the fluid machinery A2 has a rotational speed ωo and a torque To. Assuming that there is no power transmission loss in the transmission apparatus 15B, the following relation holds: ωi×Ti=ωo×To In this manner, the rotational power from the motor A1 is divided into two and distributed to the power line Rb1 passing through the fluid coupling 20 and the branched power line Rb2, and the divided rotational powers are joined together again by the power converging unit 6B, so that the transmission apparatus 15B transmits the rotational power beyond the rotational power limit of the fluid coupling 20.

Figure 7:
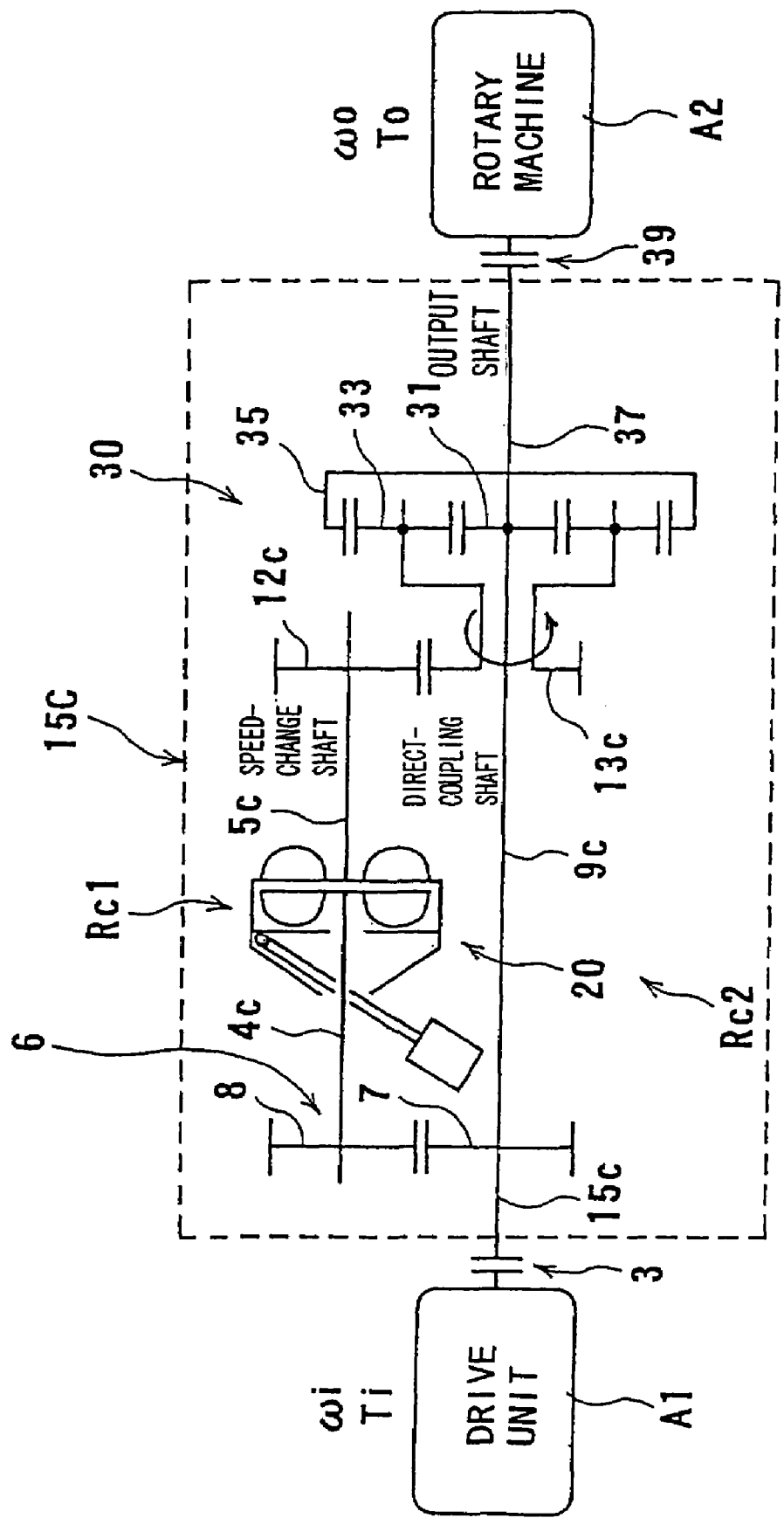
FIG. 7 is a view showing a transmission apparatus according to a third embodiment of the present invention.

FIG. 7 shows a third embodiment of the present invention. Those parts which are different from those of the first embodiment shown in FIG. 1 will be mainly described below. Those parts which are denoted by the same reference numerals as those shown FIG. 1 have identical structure and function.

In FIG. 7, a transmission apparatus 15C is disposed between a motor A1 (expressed as a drive unit A1 in FIG. 7) serving as a drive source and a fluid machinery A2 (expressed as a rotary machine A2 in FIG. 7) serving as a driven unit. The transmission apparatus 15C is coupled to the motor A1 and the fluid machinery A2 via an input-side clutch 3 and an output-side clutch 39.

The transmission apparatus 15C comprises a power-dividing unit 6, a fluid coupling 20 for speed change, and a differential planetary gear unit 30, each of which serves as an essential part thereof.

The power-dividing unit 6 distributes a rotational power of a rotating input shaft 15c connected to the input-side clutch 3 to a rotating shaft 9c, which is connected to the rotating input shaft 15c, and to a rotating shaft 4c via gears 7 and 8. A power line via the rotating shaft 4c serves as a power line Rc1, and a power line via the rotating shaft 9c serves as a power line Rc2.

The fluid coupling 20 is constructed so as to transmit the power from the rotating shaft 4c to the rotating shaft 5c.

The differential planetary gear unit 30 comprises a sun gear 31, pinion gears 33, and a ring gear 35, as with a known structure. The sun gear 31 connected to the rotating shaft 9c, and a carrier 13c which couples the rotating shaft 5c to the pinion gears 33 via the gear 12c serve as input shafts, respectively, and the ring gear 35 serves as an output shaft. The ring gear 35 is connected to the fluid machinery A2 via the output-side clutch 39.

Operation of the transmission apparatus 15C having the above-mentioned structure will be described below.

First, a rotational power having a torque Ti and a rotational speed ωi is transmitted from the motor A1 serving as a drive source to the rotating input shaft 15c of the transmission apparatus 15C via the input-side clutch 3. The rotating input shaft 15c transmits the rotational power to the power-dividing unit 6. The power-dividing unit 6 distributes the rotational power to the rotating shaft 4c of the power line Rc1 and the rotating shaft 9c of the power line Rc2. At this time, the distribution of the rotational power to the rotating shaft 4c is limited to such a degree that a torque is below a transmission limit defined by an absorption capability of the fluid coupling 20 while a rotational speed is ωi. The rotational power distributed to the rotating shaft 9c has the rotational speed ωi and a residual torque. It is preferable that the torque to be distributed to the fluid coupling 20 is selected such that an efficient transmission is achieved while the torque is kept below the transmission limit.

The rotational power of the rotating shaft 9c is transmitted to the sun gear 31 of the differential planetary gear unit 30. On the other hand, the rotational power of the rotating shaft 4c is changed in speed and torque by the fluid coupling 20 and transmitted to the carrier 13c via the gear 12c.

The rotational powers transmitted to the sun gear 31 and the carrier 13c are transmitted from the ring gear 35 to the fluid machinery A2 via the rotating shaft 37 and the output-side clutch 39. At this time, the rotational power transmitted to the fluid machinery A2 has a rotational speed ωo and a torque To. Assuming that there is no power transmission loss in the transmission apparatus 15C, the following relation holds: ωi×Ti=ωo×To In this manner, the rotational power from the motor A1 is divided into two and distributed to the power line Rc1 passing through the fluid coupling 20 and the branched power line Rc2, and the divided rotational powers are joined together again by the differential planetary gear unit 30, so that the transmission apparatus 15C transmits the rotational power beyond the rotational power limit of the fluid coupling 20.

Figure 8:
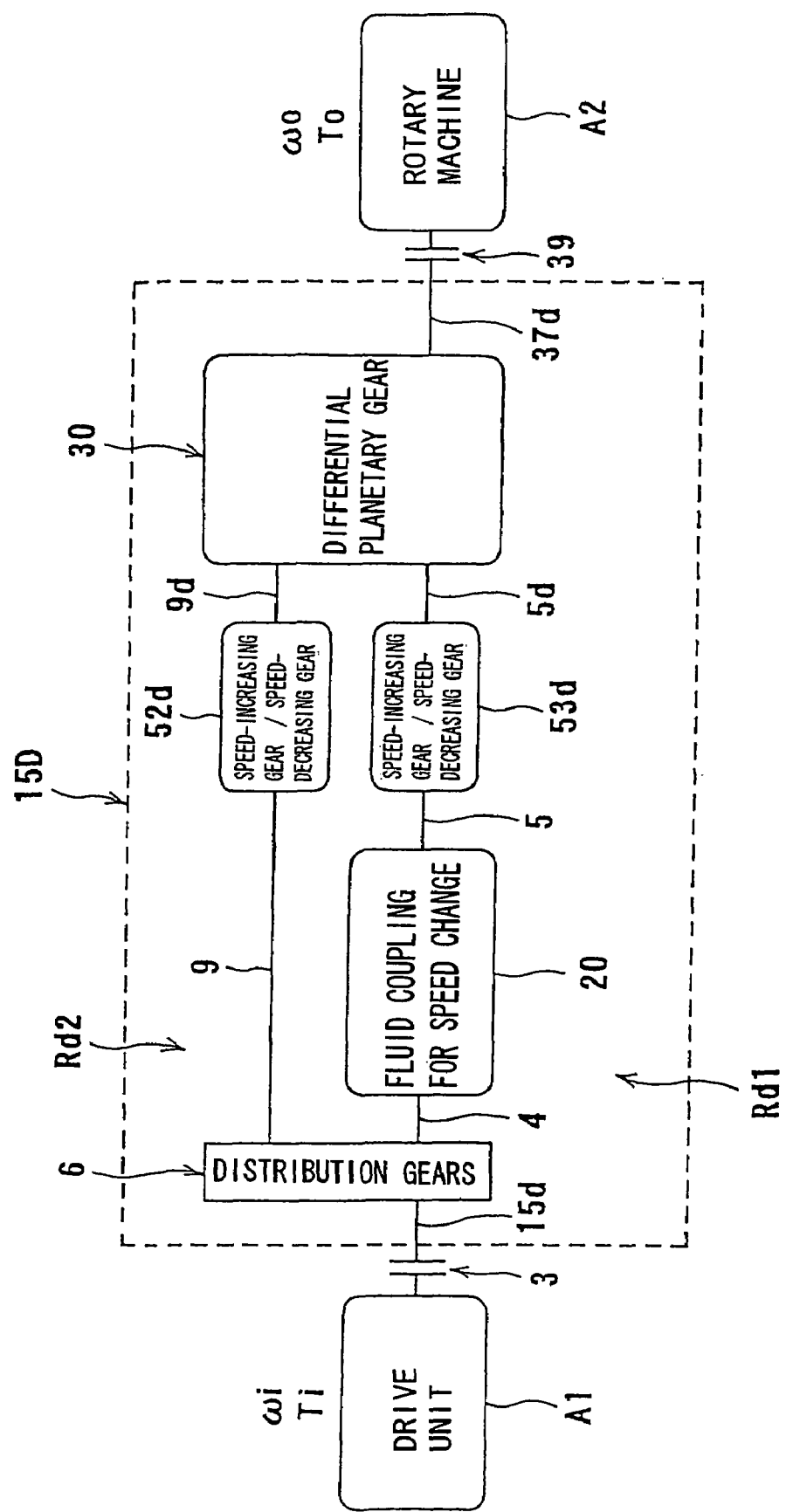
FIG. 8 is a view showing a transmission apparatus according to a fourth embodiment of the present invention.

FIG. 8 shows a fourth embodiment of the present invention. Those parts which are different from those of the first embodiment shown in FIGS. 1 and 2 will be mainly described below. Those parts which are denoted by the same reference numerals as those shown FIGS. 1 and 2 have identical structure and function.

In FIG. 8, a transmission apparatus 15D is disposed between a motor A1 (expressed as a drive unit A1 in FIG. 8) serving as a drive source and a fluid machinery A2 (expressed as a rotary machine A2 in FIG. 8) serving as a driven unit. The transmission apparatus 15D is coupled to the motor A1 and the fluid machinery A2 via an input-side clutch 3 and an output-side clutch 39.

The transmission apparatus 15D comprises a power-dividing unit (distribution gears) 6, a fluid coupling 20 for speed change, gear units 52d and 53d, and a differential planetary gear unit 30, each of which serves as an essential part thereof.

The power-dividing unit 6 is constructed so as to distribute a rotational power of a rotating input shaft 15d connected to the input-side clutch 3 to a rotating shaft 4, which is directly connected to the rotating input shaft 15d, and a separated rotating shaft 9. A power line via the rotating shaft 4 serves as a power line Rd1, and a power line via the rotating shaft 9 serves as a power line Rd2.

The fluid coupling 20 is constructed so as to transmit the power from the rotating shaft 4 to the rotating shaft 5.

The gear unit 52d for increasing or decreasing a rotational speed is provided on the rotating shaft 9 and is coupled to the differential planetary gear unit 30 via a rotating shaft 9d. The gear unit 53d for increasing or decreasing a rotational speed is provided on the rotating shaft 4 and is coupled to the differential planetary gear unit 30 via a rotating shaft 5d.

Change gear ratios of the gear units 52d and 53d are set such that a rotational speed to be input to the fluid machinery A2 via the differential planetary gear unit 30 allows the fluid machinery A2 to be operated at a maximum efficiency.

The differential planetary gear unit 30 is constructed such that the rotating shaft 9d and the rotating shaft 5d serve as the input shafts and the rotational powers of these input shafts are converged and transmitted to the rotating shaft 37d. The rotating shaft 37d is connected to the fluid machinery A2 via the output-side clutch 39.

Other components are the same as those of the first embodiment.

Operation of the transmission apparatus 15D having the above-mentioned structure will be described below.

First, a rotational power having a torque Ti and a rotational speed ωi is transmitted from the motor A1 serving as a drive source to the rotating input shaft 15d of the transmission apparatus 15D via the input-side clutch 3. The rotating input shaft 15d transmits the rotational power to the power-dividing unit 6. The power-dividing unit 6 distributes the rotational power to the rotating shaft 4 of the power line Rd1 and the rotating shaft 9 of the power line Rd2. At this time, the distribution of the rotational power to the rotating shaft 4 is limited to such a degree that a torque is below a transmission limit defined by an absorption capability of the fluid coupling 20 while a rotational speed is ωi. The rotational power distributed to the rotating shaft 9 has the rotational speed ωi and a residual torque if the power-dividing unit 6 has a gear ratio of 1. It is preferable that the torque to be distributed to the fluid coupling 20 is selected such that an efficient transmission is achieved while the torque is kept below the transmission limit.

The rotational power of the rotating shaft 9 is increased or decreased in speed by the gear unit 52d and transmitted to the differential planetary gear unit 30. On the other hand, the rotational power of the rotating shaft 4 is changed in speed and torque by the fluid coupling 20, and is further increased or decreased in speed by the gear unit 53d and transmitted to the differential planetary gear unit 30.

In the differential planetary gear unit 30, the rotating shaft 9d and the rotating shaft 5d serve as the input shafts, and the rotational powers of these input shafts are converged and transmitted to the rotating shaft 37d.

The rotational power is transmitted from the rotating shaft 37d to the fluid machinery A2 via the output-side clutch 39. At this time, the rotational power has a rotational speed ωo and a torque To. Assuming that there is no power transmission loss in the transmission apparatus 15D, the following relation holds: $\omega i \times Ti = \omega o \times To$ In this manner, the rotational power from the motor A1 is divided into two and distributed to the power line Rd1 passing through the fluid coupling 20 and the branched power line Rd2. The rotational speeds of the power line Rd1 and the power line Rd2 are changed such that the rotational speed to be input to the fluid machinery A2 allows the fluid machinery A2 to be operated at a maximum efficiency. The power line Rd1 and the power line Rd2 are joined together again by the differential planetary gear unit 30. Thus, the transmission apparatus 15D transmits the rotational power beyond the rotational power limit of the fluid coupling 20.

Figure 9:
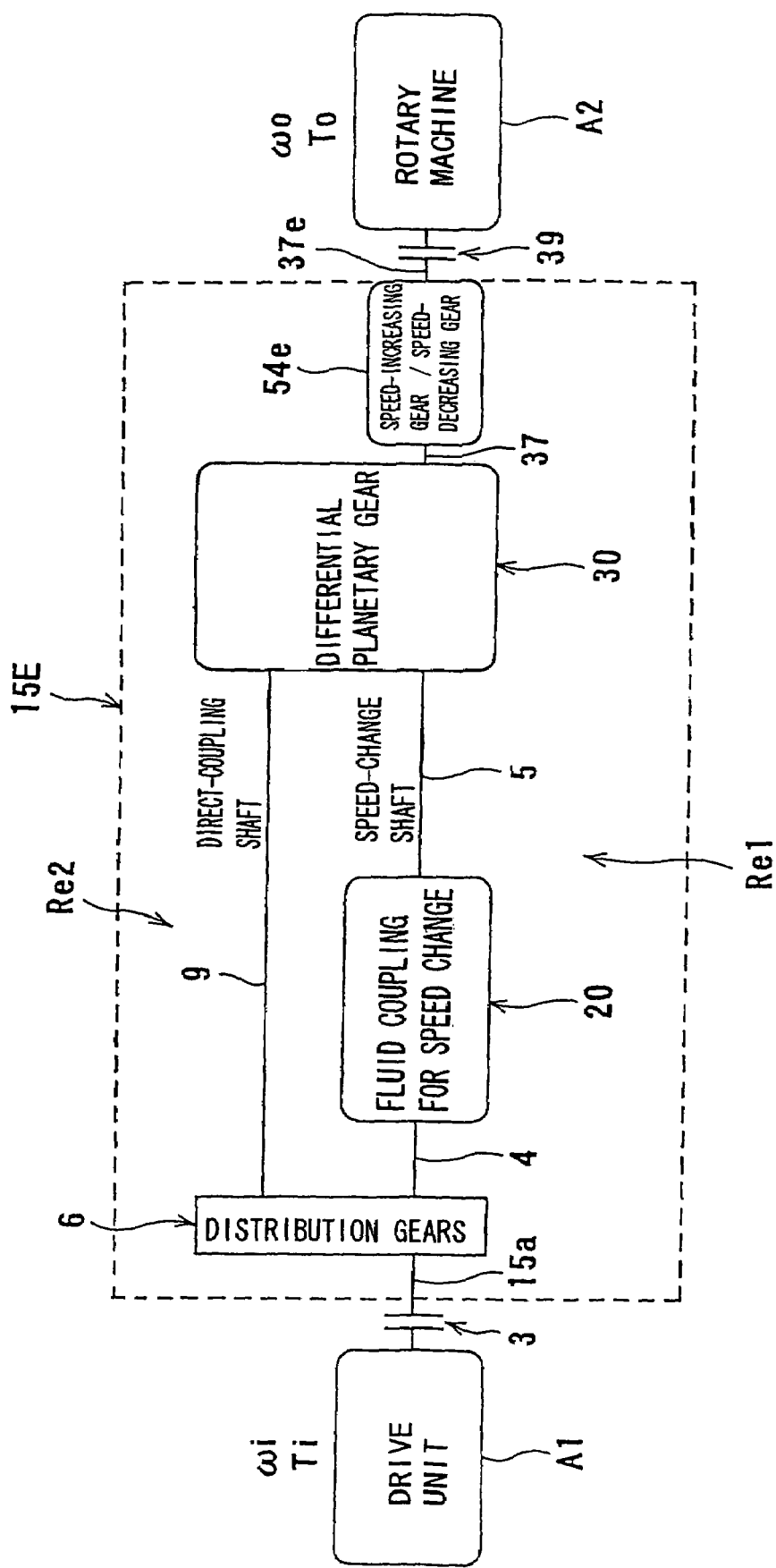
FIG. 9 is a view showing a transmission apparatus according to a fifth embodiment of the present invention.

FIG. 9 shows a fifth embodiment of the present invention. Those parts which are different from those of the first embodiment shown in FIGS. 1 and 2 will be mainly described below. Those parts which are denoted by the same reference numerals as those shown FIGS. 1 and 2 have identical structure and function.

In FIG. 9, a transmission apparatus 15E is disposed between a motor A1 (expressed as a drive unit A1 in FIG. 9) serving as a drive source and a fluid machinery A2 (expressed as a rotary machine A2 in FIG. 9) serving as a driven unit. The transmission apparatus 15E is coupled to the motor A1 and the fluid machinery A2 via an input-side clutch 3 and an output-side clutch 39.

The transmission apparatus 15E comprises a power-dividing unit (distribution gears) 6, a fluid coupling 20 for speed change, a gear unit 54e, and a differential planetary gear unit 30, each of which serves as an essential part thereof.

The power-dividing unit 6 distributes a rotational power of a rotating input shaft 15a connected to the input-side clutch 3 to a rotating shaft 4, which is directly connected to the rotating input shaft 15a, and a separated rotating shaft 9. A power line via the rotating shaft 4 serves as a power line Re1, and a power line via the rotating shaft 9 serves as a power line Re2.

The fluid coupling 20 is constructed so as to transmit the power from the rotating shaft 4 to the rotating shaft 5.

The rotating shaft 9 is connected to the differential planetary gear unit 30, and the rotating shaft 4 is connected to the differential planetary gear unit 30 via the rotating shaft 5.

The differential planetary gear unit 30 is constructed such that the rotating shaft 9 and the rotating shaft 5 serve as the input shafts and the rotational powers of these input shafts are converged and transmitted to the rotating shaft 37. The rotating shaft 37 is connected to the fluid machinery A2 via the gear unit 54e and the output-side clutch 39. A change gear ratio of the gear unit 54e is set such that the rotational speed to be input to the fluid machinery A2 allows the fluid machinery A2 to be operated at a maximum efficiency.

Other components are the same as those of the first embodiment.

Operation of the transmission apparatus 15E having the above-mentioned structure will be described below.

First, a rotational power having a torque Ti and a rotational speed $\omega i$ is transmitted from the motor A1 serving as a drive source to the rotating input shaft 15a of the transmission apparatus 15E via the input-side clutch 3. The rotating input shaft 15a transmits the rotational power to the power-dividing unit 6. The power-dividing unit 6 distributes the rotational power to the rotating shaft 4 of the power line Re1 and the rotating shaft 9 of the power line Re2. At this time, the distribution of the rotational power to the rotating shaft 4 is limited to such a degree that a torque is below a transmission limit defined by an absorption capability of the fluid coupling 20 while a rotational speed is $\omega i$. The rotational power distributed to the rotating shaft 9 has the rotational speed $\omega i$ and a residual torque if the power-dividing unit 6 has a gear ratio of 1. It is preferable that the torque to be distributed to the fluid coupling 20 is selected such that an efficient transmission is achieved while the torque is kept below the transmission limit.

The rotational power of the rotating shaft 9 is transmitted to the differential planetary gear unit 30. The rotational power of the rotating shaft 4 is changed in speed and torque by the fluid coupling 20 and transmitted to the differential planetary gear unit 30.

In the differential planetary gear unit 30, the rotating shaft 9 and the rotating shaft 5 serve as the input shafts, and the rotational powers of these input shafts are converged and transmitted to the rotating shaft 37. The rotational power of the rotating shaft 37 is changed in speed by the gear unit 54e so as to allow the fluid unit A2 to be operated at a maximum efficiency, and is transmitted to the fluid machinery A2 via the output-side clutch 39. At this time, the rotational power transmitted to the fluid machinery A2 has a rotational speed $\omega o$ and a torque To. Assuming that there is no power transmission loss in the transmission apparatus 15E, the following relation holds: $\omega i \times Ti = \omega o \times To$ In this manner, the rotational power from the motor A1 is divided into two and distributed to the power line Re1 passing through the fluid coupling 20 and the branched power line Re2, and the divided rotational powers are joined together again by the differential planetary gear unit 30. Thus, the transmission apparatus 15E transmits the rotational power beyond the rotational power limit of the fluid coupling 20. Further, the rotational speed to be input to the fluid machinery A2 is changed by the gear unit 54e so that the fluid machinery A2 is operated at a maximum efficiency.

Figure 10:
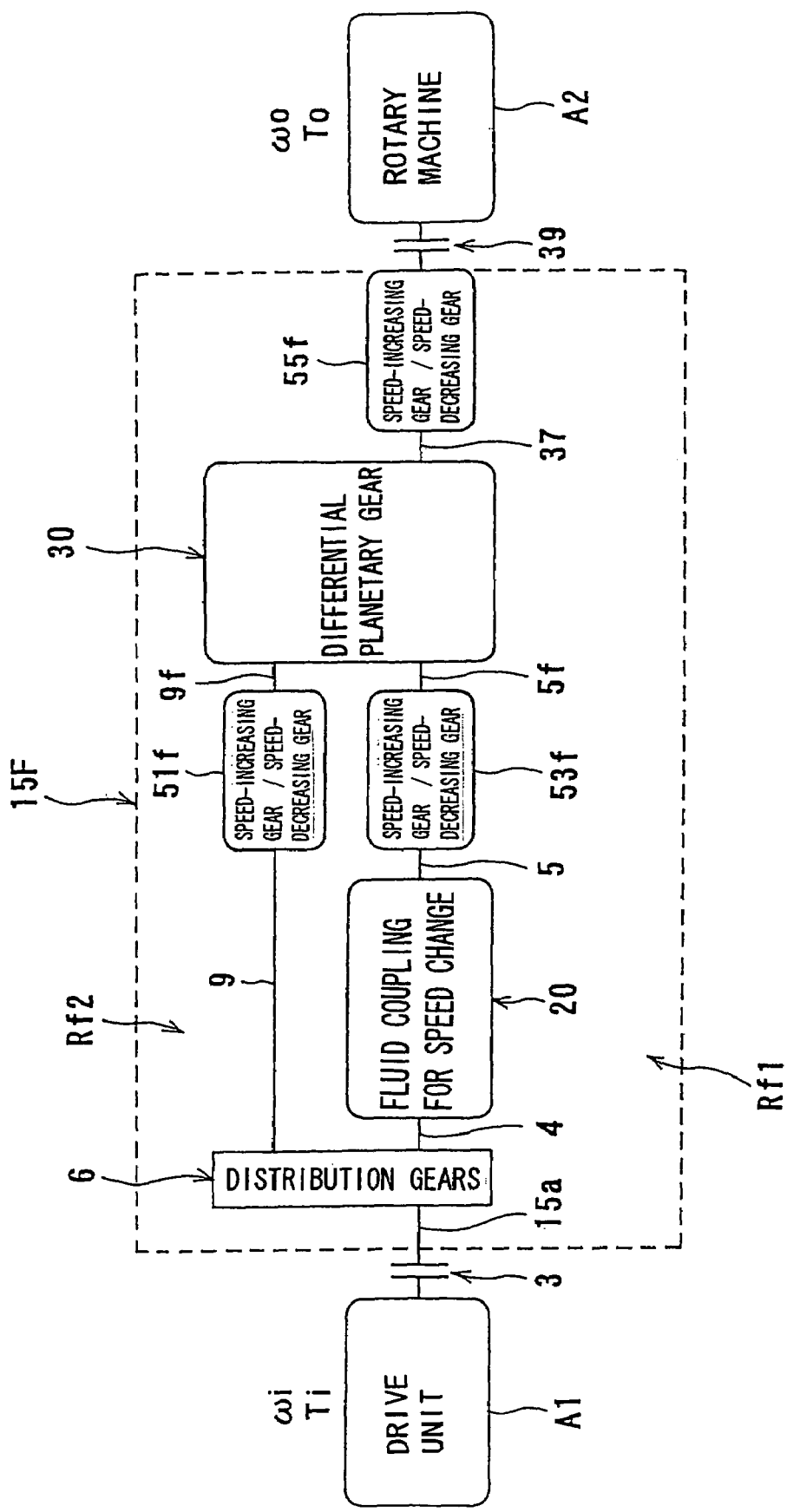
FIG. 10 is a view showing a transmission apparatus according to a sixth embodiment of the present invention.

FIG. 10 shows a sixth embodiment of the present invention. Those parts which are different from those of the first embodiment shown in FIGS. 1 and 2 will be mainly described below. Those parts which are denoted by the same reference numerals as those shown FIGS. 1 and 2 have identical structure and function.

In FIG. 10, a transmission apparatus 15F is disposed between a motor A1 serving as a drive source and a fluid machinery A2 serving as a driven unit. The transmission apparatus 15F is coupled to the motor A1 and the fluid machinery A2 via an input-side clutch 3 and an output-side clutch 39.

The transmission apparatus 15F comprises a power-dividing unit (distribution gears) 6, a fluid coupling 20 for speed change, gear units 51f, 53f and 55f, and a differential planetary gear unit 30, each of which serves as an essential part thereof.

The power-dividing unit 6 is constructed so as to distribute a rotational power of a rotating input shaft 15a connected to the input-side clutch 3 to a rotating shaft 4, which is directly connected to the rotating input shaft 15a, and a separated rotating shaft 9. A power line via the rotating shaft 4 serves as a power line Rf1, and a power line via the rotating shaft 9 serves as a power line Rf2.

The fluid coupling 20 is constructed so as to transmit the power from the rotating shaft 4 to the rotating shaft 5.

The gear unit 51f for increasing or decreasing a rotational speed is provided on the rotating shaft 9. The rotational power, which is distributed to the rotating shaft 9 by the distribution gears 6, is increased or decreased in speed by the gear unit 51f, and is further transmitted to the differential planetary gear unit 30 via a rotating shaft 9f. The gear unit 53f for increasing or decreasing a rotational speed is provided on the rotating shaft 5. The rotational power, which is distributed to the rotating shaft 4 by the distribution gears 6, is increased or decreased in speed by the gear unit 53*f*, and is further transmitted to the differential planetary gear unit 30 via a rotating shaft 5*f*.

The differential planetary gear unit 30 is constructed such that the rotating shaft 9*f* and the rotating shaft 5*f* serve as the input shafts and the rotational powers of these input shafts are converged and transmitted to the rotating shaft 37. The rotating shaft 37 is connected to the fluid machinery A2 via the gear unit 55*f* for increasing or decreasing the rotational speed and the clutch 39.

Change gear ratios of the gear units 51*f*, 53*f* and 55*f* are set such that the fluid machinery A2 is operated at a maximum efficiency.

Other components are the same as those of the first embodiment.

Operation of the transmission apparatus 15F having the above-mentioned structure will be described below.

First, a rotational power having a torque Ti and a rotational speed ωi is transmitted from the motor A1 serving as a drive source to the rotating input shaft 15*a* of the transmission apparatus 15F via the input-side clutch 3. The rotating input shaft 15*a* transmits the rotational power to the power-dividing unit 6. The power-dividing unit 6 distributes the rotational power to the rotating shaft 4 of the power line Rf1 and the rotating shaft 9 of the power line Rf2. At this time, the distribution of the rotational power to the rotating shaft 4 is limited to such a degree that a torque is below a transmission limit defined by an absorption capability of the fluid coupling 20 while a rotational speed is ωi. The rotational power distributed to the rotating shaft 9 has the rotational speed ωi and a residual torque if the power-dividing unit 6 has a gear ratio of 1. It is preferable that the torque to be distributed to the fluid coupling 20 is selected such that an efficient transmission is achieved while the torque is kept below the transmission limit.

The rotational power of the rotating shaft 9 is increased or decreased in speed by the gear unit 51*f* and transmitted to the differential planetary gear unit 30. On the other hand, the rotational power of the rotating shaft 4 is changed in speed and torque by the fluid coupling 20, and is further increased or decreased in speed by the gear unit 53*f* and transmitted to the differential planetary gear unit 30.

In the differential planetary gear unit 30, the rotating shaft 9*f* and the rotating shaft 5*f* serve as the input shafts, and the rotational powers of these input shafts are converged and transmitted to the rotating shaft 37.

The rotational power of the rotating shaft 37 is changed in speed by the gear unit 55*f* so as to allow the fluid unit A2 to be operated at a maximum efficiency, and is transmitted to the fluid machinery A2 via the output-side clutch 39. At this time, the rotational power has a rotational speed ωo and a torque To. Assuming that there is no power transmission loss in the transmission apparatus 15F, the following relation holds: ωi×Ti=ωo×To In this manner, the rotational power from the motor A1 is divided into two and distributed to the power line Rf1 passing through the fluid coupling 20 and the branched power line Rf2, and the divided rotational powers are joined together again by the differential planetary gear unit 30, so that the transmission apparatus 15F transmits the rotational power beyond the rotational power limit of the fluid coupling 20. Further, the rotational speed to be input to the fluid machinery A2 is changed by the gear units 51*f*, 53*f* and 55*f* so that the fluid machinery A2 is operated at a maximum efficiency.

Figure 11:
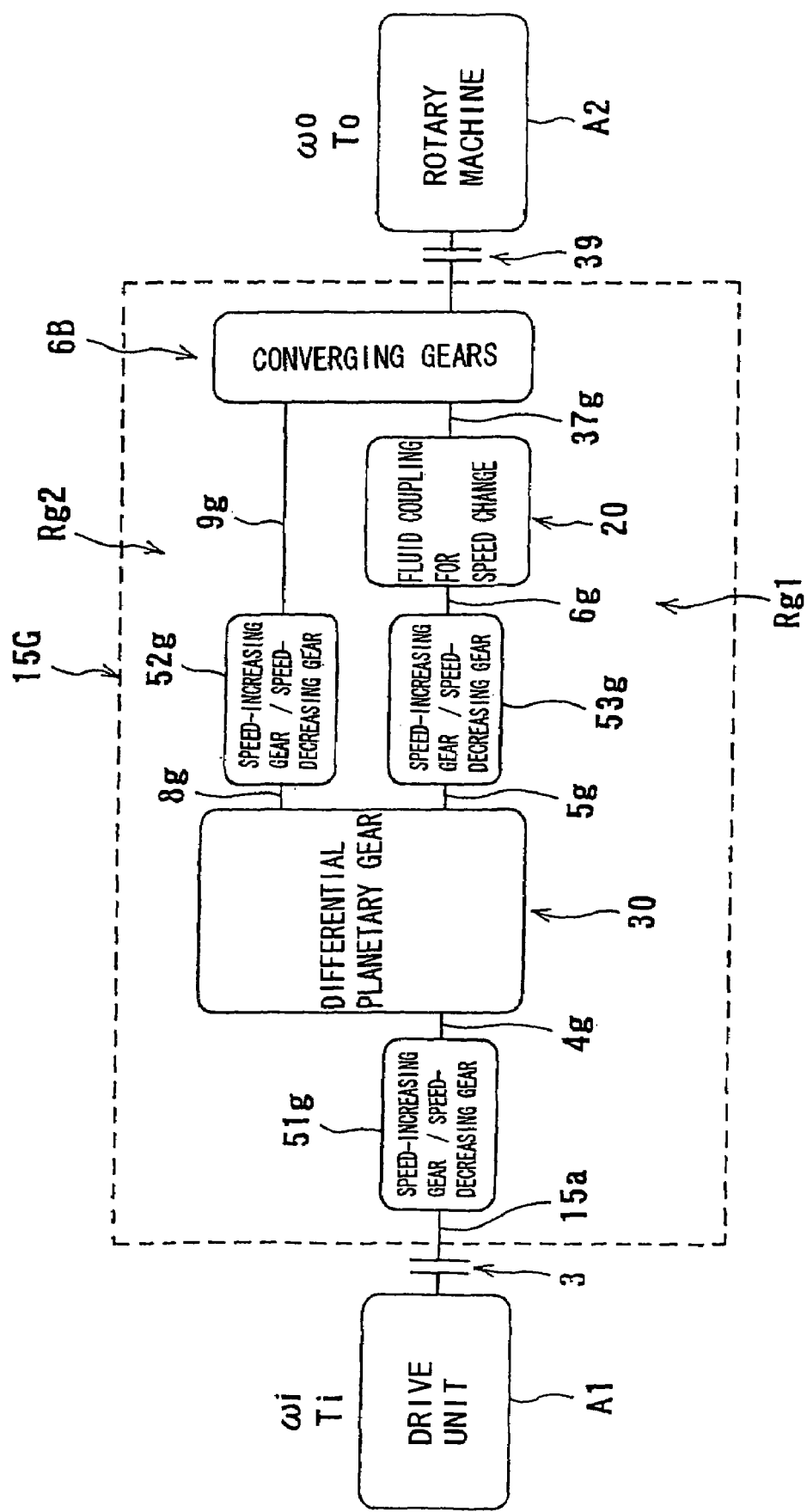
FIG. 11 is a view showing a transmission apparatus according to a seventh embodiment of the present invention.

FIG. 11 shows a seventh embodiment of the present invention. Those parts which are different from those of the first embodiment shown in FIGS. 1 and 2 will be mainly described below. Those parts which are denoted by the same reference numerals as those shown FIGS. 1 and 2 have identical structure and function.

In FIG. 11, a transmission apparatus 15G is disposed between a motor A1 (expressed as a drive unit A1 in FIG. 11) serving as a drive source and a fluid machinery A2 (expressed as a rotary machine A2 in FIG. 11) serving as a driven unit. The transmission apparatus 15G is coupled to the motor A1 and the fluid machinery A2 via an input-side clutch 3 and an output-side clutch 39.

The transmission apparatus 15G comprises a differential planetary gear unit 30, a fluid coupling 20 for speed change, gear units 51*g*, 52*g* and 53*g*, and a power converging unit (joining gears) 6B, each of which serves as an essential part thereof.

The gear unit 51*g* for increasing or decreasing a rotational speed is provided on the rotating input shaft 15*a* connected to the input-side clutch 3. The rotational power, which is transmitted to the rotating input shaft 15*a*, is increased or decreased in speed by the gear unit 51*g*, and is further transmitted to the differential planetary gear unit 30 via a rotating shaft 4*g*.

The differential planetary gear unit 30 is constructed so as to distribute the rotational power of the rotating shaft 4*g* to a rotating shaft 8*g* and a rotating shaft 5*g*.

The gear unit 52*g* for increasing or decreasing a rotational speed is provided on the rotating shaft 8*g*. The rotational power, which is distributed to the rotating shaft 8*g* by the differential planetary gear unit 30, is increased or decreased in speed by the gear unit 52*g*, and is further transmitted to one of input shafts of the power converging unit 6B via a rotating shaft 9*g*. The gear unit 53*g* for increasing or decreasing a rotational speed is provided on the rotating shaft 5*g*, and is coupled to the fluid coupling 20 via a rotating shaft 6*g*. The fluid coupling 20 is connected to the other of the input shafts of the power converging unit 6B via a rotating shaft 37*g*.

A power line via the fluid coupling 20 serves as a power line Rg1, and a power line via the rotating shaft 9*g* serves as a power line Rg2.

The power converging unit 6B is constructed so as to converge the rotational powers from the rotating shaft 9*g* and the rotating shaft 37*g* and transmit the converged rotational power to the output-side clutch 39.

Change gear ratios of the gear units 51*g*, 52*g* and 53*g* are set such that the rotational speed to be input to the fluid machinery A2 allows the fluid machinery A2 to be operated at a maximum efficiency.

Other components are the same as those of the first embodiment.

Operation of the transmission apparatus 15G having the above-mentioned structure will be described below.

First, a rotational power having a torque Ti and a rotational speed ωi is transmitted from the motor A1 serving as a drive source to the rotating input shaft 15*a* of the transmission apparatus 15G via the input-side clutch 3. The rotational speed of the rotating input shaft 15*a* is increased or decreased by the gear unit 51*g*, and the rotational power transmitted to the rotating input shaft 15*a* is transmitted to the differential planetary gear unit 30 via the gear unit 51*g*.

The differential planetary gear unit 30 distributes the rotational power of the rotating input shaft 15*a* to the rotating shaft 5*g* of the power line Rg1 and the rotating shaft 8*g* of the power line Rg2. At this time, a torque of the rotational power to be distributed to the rotating shaft 5*g* is limited to a level below a transmission limit defined by an absorption capability of the fluid coupling 20, and a residual torque is distributed to the rotating shaft 8g. It is preferable that the rotational power to be distributed to the fluid coupling 20 is adjusted by the gear unit 53g such that an efficient transmission is achieved while the rotational speed and the torque are kept below the transmission limit.

The rotating shaft 8g transmits the torque to the power converging unit 6B via the gear unit 52g and the rotating shaft 9g, and the rotating shaft 5g transmits the torque to the power converging unit 6B via the gear unit 53g, the rotating shaft 6g, and the fluid coupling 20.

In the power converging unit 6B, the rotational powers of the rotating shaft 9g and the rotating shaft 37g are converged into one rotational power, which is transmitted to the fluid machinery A2 via the output-side clutch 39. At this time, the rotational power has a rotational speed ωo and a torque To. Assuming that there is no power transmission loss in the transmission apparatus 15G, the following relation holds: ωi×Ti=ωo×To In this manner, the rotational power from the motor A1 is changed in speed by the gear unit 51g so as to meet a performance of the differential planetary gear unit 30, and is divided into two and distributed to the power line Rg1 passing through the fluid coupling 20 and the power line Rg2. The power line Rg1 and the power line Rg2 are converged again by the power converging unit 6B. Thus, the transmission apparatus 15G transmits the rotational power beyond the rotational power limit of the fluid coupling 20. Further, the rotational speed to be input to the fluid machinery A2 is changed by the gear units 52g and 53g so as to allow the fluid machinery A2 to be operated at a maximum efficiency.

Advantages of the transmission apparatus according to the present invention shown in FIGS. 1 through 11 are listed below.

(1) The rotational power beyond the transmission limit of the joint unit is not input to the joint unit, and hence the rotational power can be transmitted efficiently. Further, the fluid coupling can absorb various kinds of vibrations and impacts such as pulsation of the input rotational power, shock due to speed change, and torsion vibration of the shaft, thus enabling a smooth transmission of the power.

(2) The input power is divided into two by the differential planetary gear unit, so that one of the divided powers, which is below the transmission limit, is distributed to the fluid coupling and the other is directly distributed to the dividing unit. Accordingly, the transmission apparatus can transmit the power beyond the transmission limit of the fluid coupling.

(3) The gear unit is provided on the power line so that the rotational speed to be transmitted to the fluid machinery is changed while keeping the rotational power of the drive source constant. With this structure, an efficiency of the fluid machinery can be optimized.

Figure 12:
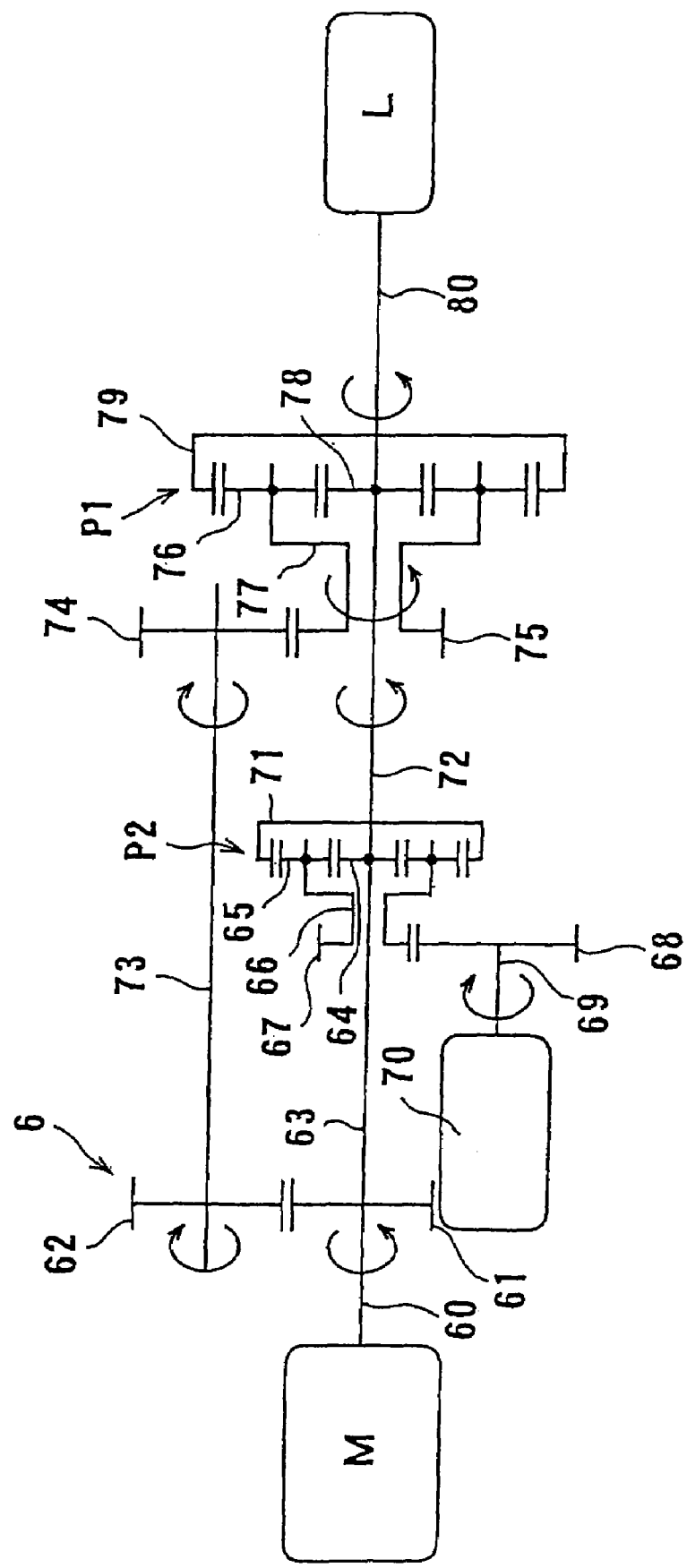
FIG. 12 is a view illustrating a transmission apparatus according to an eighth embodiment of the present invention.

FIG. 12 shows an eighth embodiment. In FIG. 12, an output shaft 60 of a drive unit, e.g., an electric motor M, is coupled to a first gear 61 constituting a dividing unit 6. The first gear 61 is in mesh with a second gear 62 of the dividing unit 6.

The dividing unit 6 has a first output shaft 63 serving as a rotating shaft of the first gear 61. This first output shaft 63 is connected to a sun gear 64 of a second differential planetary gear unit P2. A carrier 66 of planetary gears 65 of the differential planetary gear unit P2 is coupled to a gear 67 meshing with a gear 68 that is coupled to an output shaft 69 of a small-capacity variable-speed motor 70. A ring gear 71 of the second differential planetary gear unit P2 is connected to an output shaft 72.

In this example shown in FIG. 12, the output shaft 60 of the drive unit M is connected to the sun gear 64 via the output shaft 63, and a rotational power of the variable-speed motor 70 is transmitted to the planetary gears 65. Although the ring gear 71 is connected to the output shaft 72, connection arrangement can be made freely. For example, the output shaft 63 may be connected to the ring gear 71 or the carrier 66, or the output shaft 69 of the variable-speed motor 70 may be connected to the sun gear 64 or the ring gear 71. Further, the output shaft 72 may be connected to the sun gear 64 or the carrier 66.

Specifically, when practicing the present invention, the connection arrangement of three rotating parts of the differential planetary gear unit can be selected freely. Therefore, in the case of not specifying the gear, the three rotating parts will be referred to as a first rotating element, a second rotating element, and a third rotating element.

An output shaft 73 of the second gear 62 of the dividing unit 6 is connected to a gear 74, and this gear 74 meshes with a gear 75 coupled to the carrier 77 of the planetary gears 76 of a first differential planetary gear unit P1.

The output shaft 72 of the second differential planetary gear unit P2 is connected to the sun gear 78 of the first differential planetary gear unit P1, and a ring gear 79 of the first differential planetary gear unit P1 is coupled to a load L such as a fluid machinery via an output shaft 80.

Therefore, a rotational power of the output shaft 60 of the drive unit M is distributed to the output shaft 63 of the first gear 61 and the output shaft 73 of the second gear 62 by the dividing unit 6. The planetary gears 65 of the second differential planetary gear unit P2 are rotated by the rotation of the variable-speed motor 70, and hence the rotational speed of the ring gear 71 is changed according to the rotational speed of the planetary gears 65. In this manner, as the rotational speed of the output shaft 72 of the second differential planetary gear unit P2 is changed, the rotational speed of the sun gear 78 of the first differential planetary gear unit P1 is also changed. As a result, the rotational speed of the output shaft 80 of the first differential planetary gear unit P1 can be changed, and hence the rotational speed of the load L can be controlled.

Figure 13:
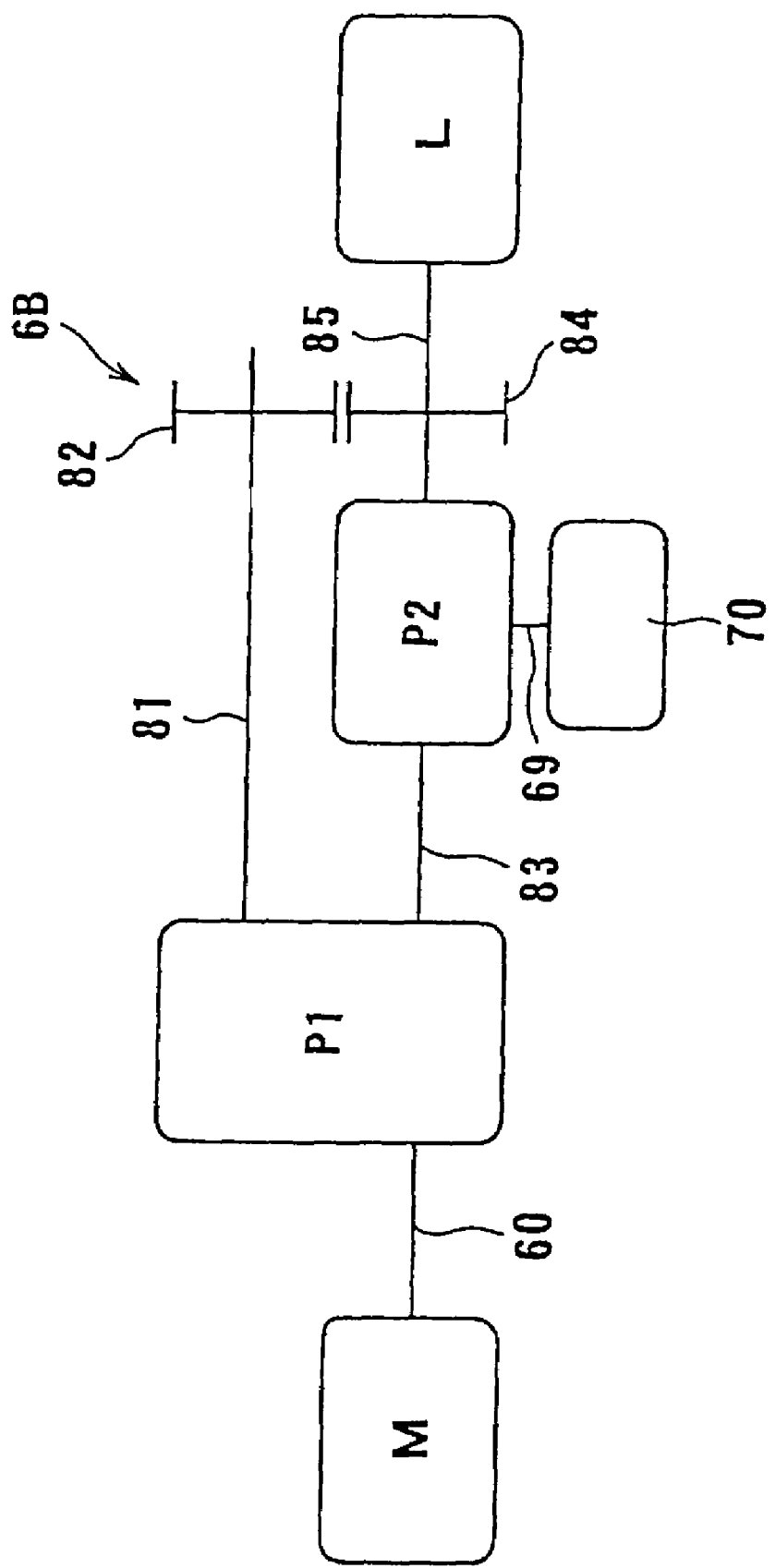
FIG. 13 is a view illustrating a transmission apparatus according to a ninth embodiment of the present invention.

FIG. 13 shows a ninth embodiment of the present invention. An output shaft 60 of a drive unit M is connected to a first rotating element of a first differential planetary gear unit P1, and is also connected to a second rotating element, which mainly transmits a power, of the first differential planetary gear unit P1. A first output shaft 81 is a direct-coupling shaft and is connected to a second gear 82 of a converging unit 6B. A second output shaft 83, which is connected to a third rotating element of the first differential planetary gear unit P1, is a speed-change shaft and is connected to a first rotating element of the second differential planetary gear unit P2.

A second rotating element of this second differential planetary gear unit P2 is connected to an output shaft 69 serving as a motor shaft of a small-capacity variable-speed motor 70. Further, a third rotating element of the second differential planetary gear unit P2 is connected to a first gear 84 meshing with the second gear 82 of the converging unit 6B. An output shaft 85 of the converging unit 6B, i.e., a shaft of the first gear 84, is connected to the load L.

In this embodiment shown in FIG. 13 also, most of the rotational power of the drive unit M is transmitted from the output shaft 81, which serves as a direct-coupling shaft connected to the second rotating element of the first differential planetary gear unit P1, to the load L via the dividing unit 6. A rotational speed of the third rotating element of the first differential planetary gear unit P1 is changed according to the rotational speed of the variable-speed motor 70, i.e., the rotational speed of the second output shaft 83 serving as a speed-change shaft. As a result, the rotational speed of the first output shaft 81 is changed.

Figure 14:
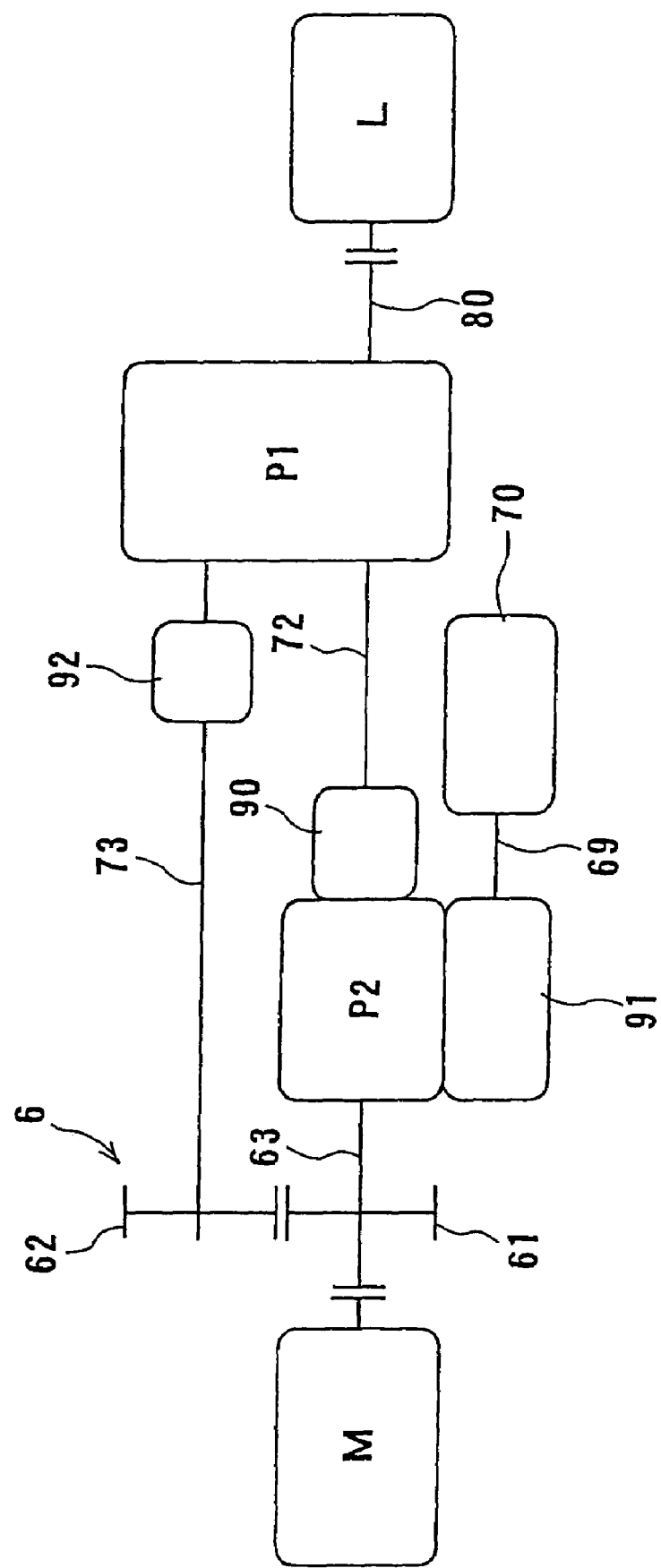
FIG. 14 is a view illustrating a transmission apparatus according to a tenth embodiment of the present invention.

FIG. 14 shows a tenth embodiment of the present invention. An example shown in FIG. 14 is a modification of the eighth embodiment shown in FIG. 12, and corresponding parts are denoted by the same reference numerals. Only different parts will be described below.

In the example shown in FIG. 14, a clutch 90 is provided on an output shaft 72 of the second differential planetary gear unit P2. An output shaft 69 of the variable-speed motor 70 is connected to the second differential planetary gear unit P2 via a speed-increasing gear unit 91 having a direct-coupling switch clutch (not shown). Further, a clutch 92 is provided on an output shaft 73.

In this example, the clutches 90 and 92 are disengaged, and the direct-coupling switch clutch is switched to the speed-increasing side. Then, the variable-speed motor 70 starts the drive unit such as a squirrel-cage induction motor. When the drive unit M is increased to a predetermined rotational speed, the drive unit M is energized. According to such an operation manner, electric power for the starting can be small.

In the eight through tenth embodiments also, the rotational powers transmitted via the direct-coupling shafts (output shafts) 73 and 81 are larger than the rotational powers transmitted via the speed-change shafts 72 and 83, respectively. Accordingly, even if the second differential planetary gear unit P2 and the variable-speed motor 70 each constituting the joint unit have a small capacity, it is possible to appropriately change the rotational speed of the load L having a large capacity.

However, when practicing the present invention, if a negative rotational power is transmitted to the speed-change shafts 72 and 83, i.e., if feedback occurs, the rotational power to be transmitted to the direct-coupling shafts 73 and 81 becomes large by the same amount. Therefore, it is important in designing the transmission apparatus to prevent the feedback from occurring at any rotational speed.

Figure 15:
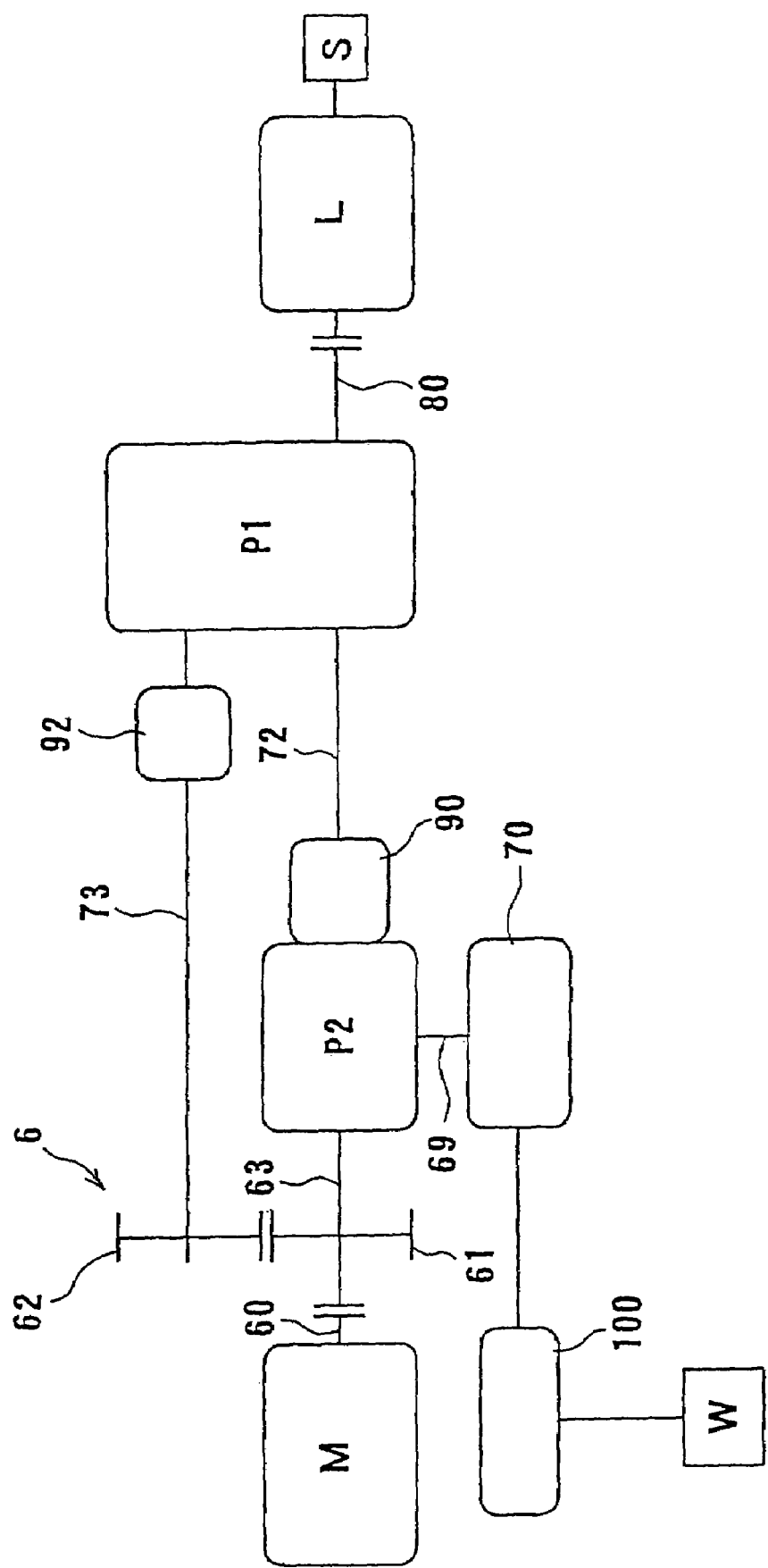
FIG. 15 is a view illustrating a transmission apparatus according to an eleventh embodiment of the present invention.
Figure 16:
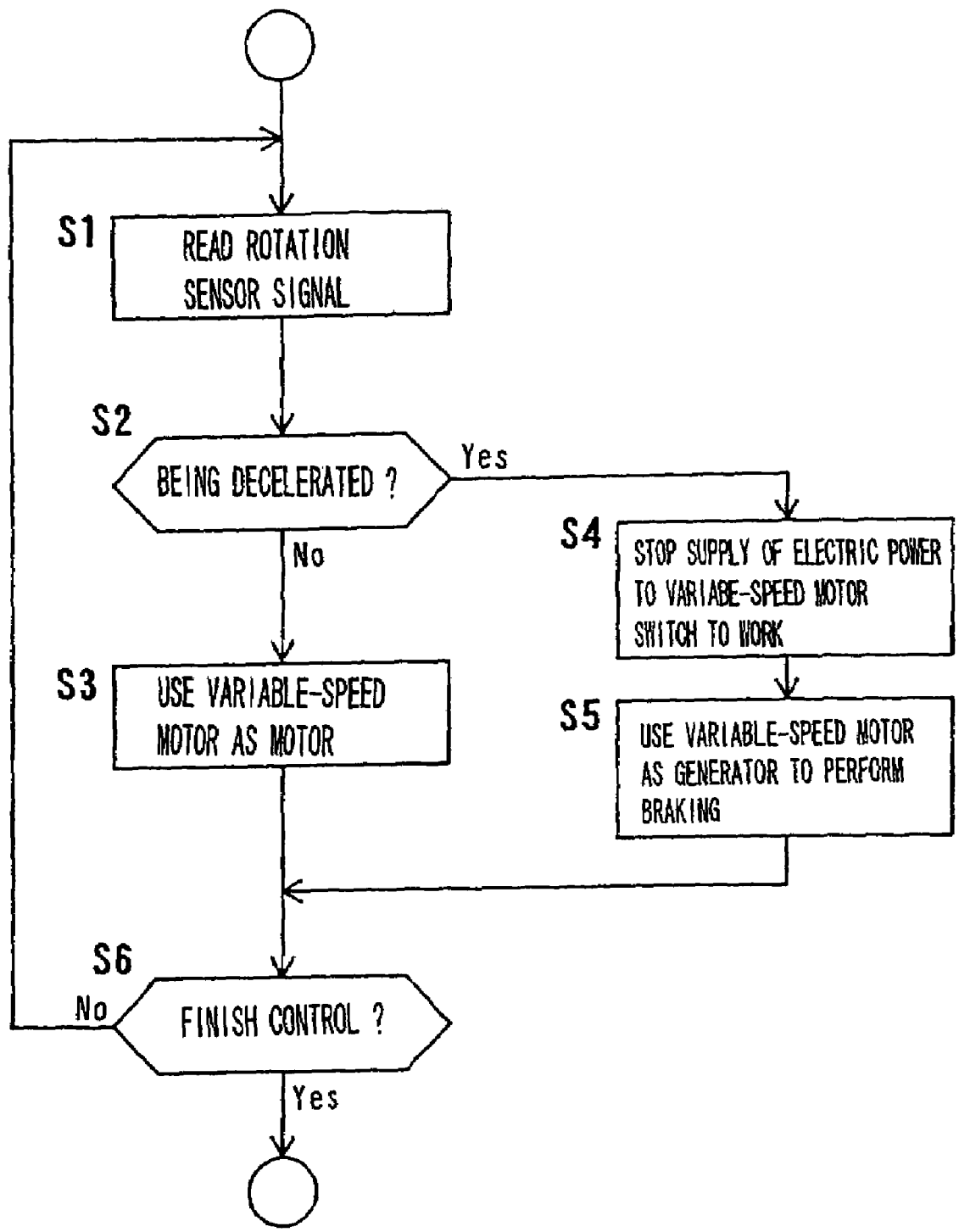
FIG. 16 is a flow chart illustrating an operation of the eleventh embodiment shown in FIG. 15.

FIGS. 15 and 16 show an eleventh embodiment which is a modification of the eighth embodiment. As with the FIG. 14, those parts corresponding to those in FIG. 12 are denoted by the same reference numerals, and only different parts will be described below.

In an example shown in FIGS. 15 and 16, a clutch 90 is provided on the output shaft 72 of the second differential planetary gear unit P2, i.e., a speed-change shaft. The variable-speed motor 70 is controlled by an inverter controller 100. When the load L is decelerated, the variable-speed motor 70 is utilized as a generator and supplies current to a work W, whereby the variable-speed motor 70 is utilized as a brake, as described later. As with the example shown in FIG. 14, a clutch 92 is provided on the direct-coupling shaft 73. A reference sign S in the drawing represents a rotation sensor of the load L.

When the variable-speed motor 70 is utilized as a brake, the work W can be applied to a variety of actions such as heat generation due to resistance, storing electricity to a storage battery, and selling electricity to a commercial power source through a frequency inverter.

Operation will be described with reference to FIG. 16. A controller unit (not shown) receives a signal from the rotation sensor S and then sends a switching signal to the inverter controller 100 for the work W.

First, the control unit reads the signal from the rotational sensor S (step S1), and decides whether or not the load L is decelerated (step S2). In the case of NO in step S2, then the variable-speed motor 70 is used as a motor (step S3), and the control unit decides whether or not the control is finished (step S6). If the control is not finished, then the process proceeds to step S1. If the control is finished, then the operation is finished.

In the case of YES in step S2, i.e., when the load L is decelerated, the control unit stops the supply of the electric power to the variable-speed motor 70 and switches connection of the variable-speed motor 70 to the work W (step S4). As a result, the variable-speed motor 70 acts as a generator to perform braking (step S5). Then, whether the control is finished or not is decided (step S6).

Figure 17:
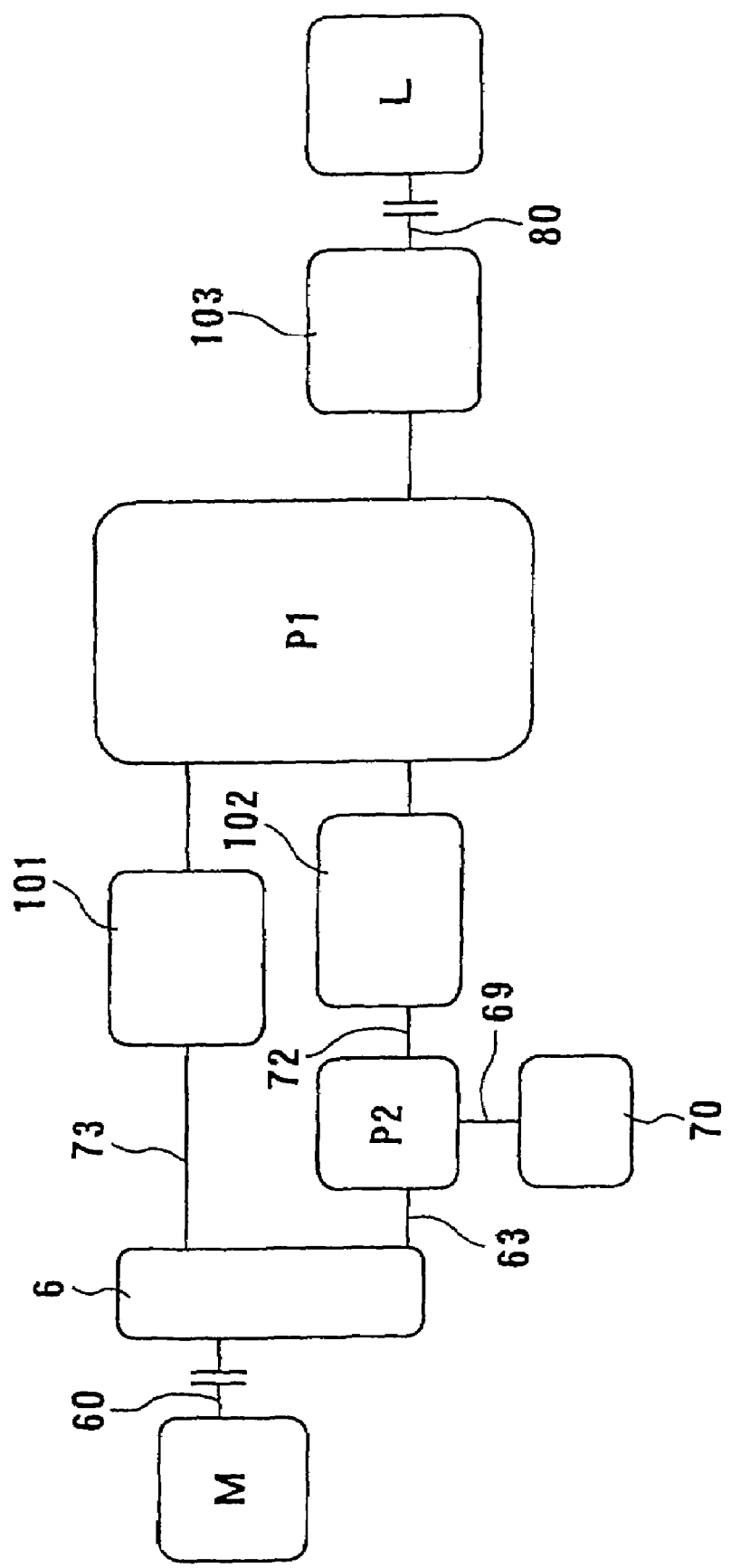
FIG. 17 is a view illustrating a twelfth embodiment of the present invention.
Figure 18:
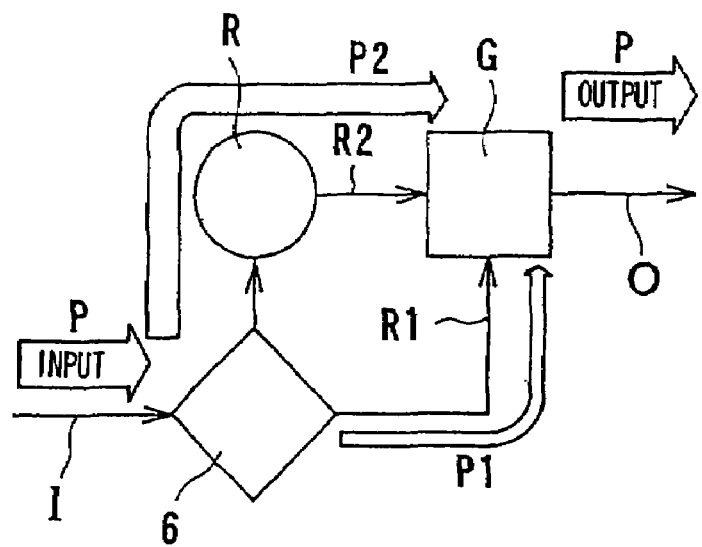
FIG. 18 is a view illustrating a power flow of a joint unit distributed by a dividing unit.
Figure 19:
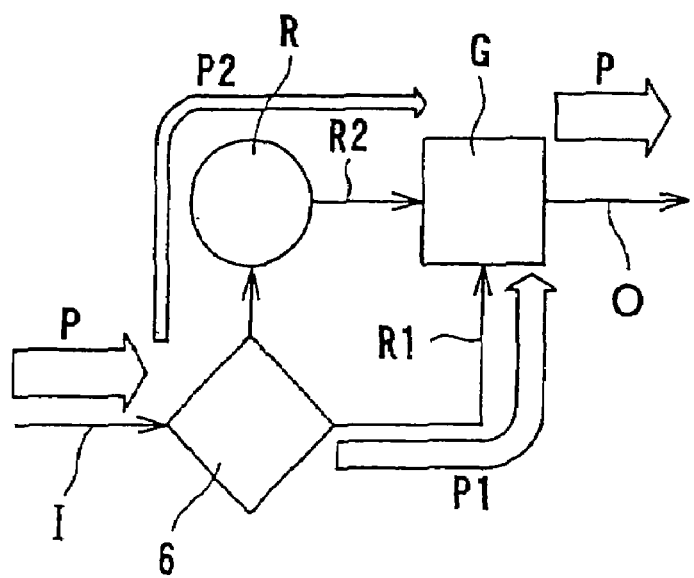
FIG. 19 is a view illustrating another power flow of the joint unit distributed by the dividing unit.
Figure 20:
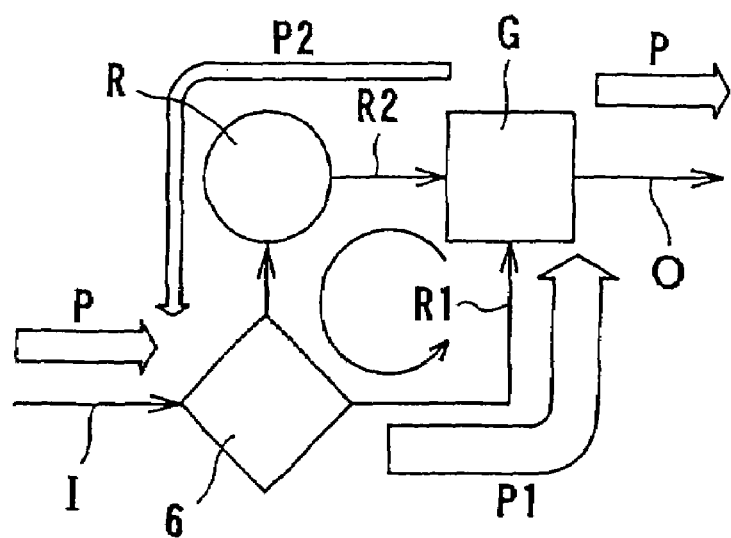
FIG. 20 is a view illustrating still another power flow of the joint unit distributed by the dividing unit.
Figure 21:
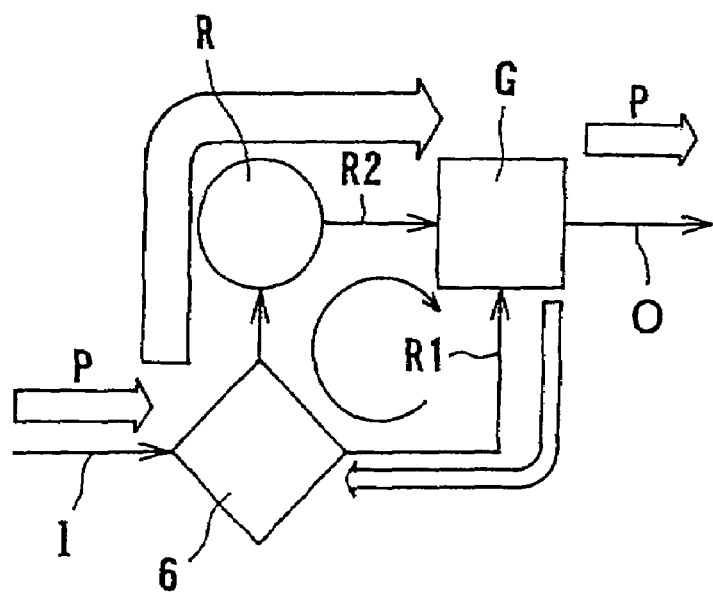
FIG. 21 is a view illustrating still another power flow of the joint unit distributed by the dividing unit.
Figure 22:
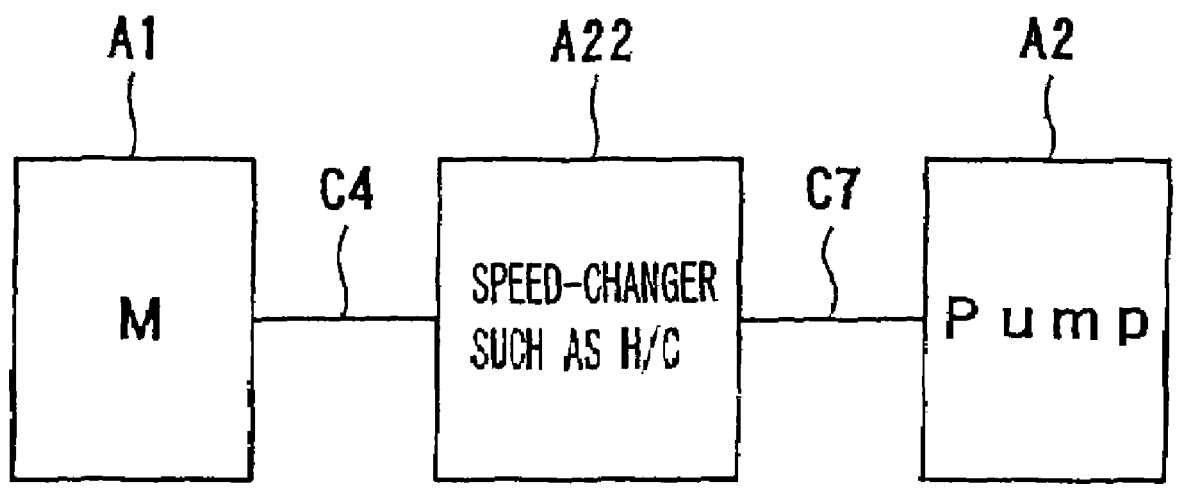
FIG. 22 is a block diagram illustrating a relationship between a drive source, a fluid coupling, and a driven unit of a conventional apparatus.

FIG. 17 shows a modification of the embodiment shown in FIG. 12. In the embodiment shown in FIG. 17, the direct-coupling shaft 73 is coupled to the first rotating element of the first differential planetary gear unit P1 via a first speed-increasing or speed-decreasing gear 101. The output shaft 72 of the second differential planetary gear unit P2 is coupled to the second rotating element of the first differential planetary gear unit P1 via a second speed-increasing or speed-decreasing gear 102. The third rotating element of the first differential planetary gear unit P1 is coupled to the load L via a third speed-increasing or speed-decreasing gear 103 and the output shaft 80.

Since the speed-increasing or speed-decreasing gears 101 through 103 are provided as described above, distribution of power flow can be optimized and operation manner of the load L can be diversified.

According to the transmission apparatus of the present invention shown in FIGS. 12 through 17, because the joint unit is constituted by a combination of the second differential planetary gear unit and the variable-speed motor, a smooth speed-change operation can be performed by changing the speed of the variable-speed motor. Further, because the rotational power can be transmitted mainly via the coupling shaft serving as the direct-coupling shaft coupling the first differential planetary gear unit and the dividing unit, the capacity of the second differential planetary gear unit and the variable-speed motor as the joint unit can be small. As a result, it is possible to provide a transmission apparatus which can perform an efficient speed-change operation with small impact.

INDUSTRIAL APPLICABILITY

The present invention is suitable for use in a transmission apparatus having at least one of a dividing unit and a differential planetary gear unit and having a joint unit.

The invention claimed is:
1. A transmission apparatus, comprising:
a differential planetary gear unit;
a fluid coupling having a scoop tube disposed either at a power input side thereof or at a power output side thereof; and
a converging unit;
wherein an input rotational power input to said transmission apparatus is transmitted to said differential planetary gear unit via a single input shaft and is transmitted to a first output shaft and a second output shaft of said differential planetary gear unit;
wherein said first output shaft of said differential planetary gear unit is connected to a first input shaft of a converging unit; and
wherein said second output shaft of said differential planetary gear unit is connected to a second input shaft of said converging unit via said fluid coupling, wherein a first output rotational power output to said first output shaft is larger than a second output rotational power output to said second output shaft and transmitted via said fluid coupling, and wherein the second output rotational power output to said second output shaft is smaller than the input rotational power input to said transmission apparatus.

2. A transmission apparatus, comprising:

a dividing unit to which an input rotational power from a drive unit is transmitted, said drive unit outputting a first output rotational power and a second output rotational power;

a joint unit; and a first differential planetary gear unit receiving said first output rotational power and said second output rotational power;

wherein said second output rotational power, which is transmitted via said joint unit, is smaller than said first output rotational power, and wherein said joint unit comprises an electric motor and a second differential planetary gear unit.

3. A transmission apparatus according to claim 2, wherein said second differential planetary gear unit has a single-pinion-type structure in which one planetary gear is arranged in a radial direction and one or more planetary gears are arranged in a circumferential direction in a region between a sun gear and a ring gear; and wherein each of said drive unit, said electric motor, and a load is directly connected to any one of an input shaft, an output shaft, and a speed-change shaft of said second differential planetary gear unit.

4. A transmission apparatus, comprising:

at least one of a dividing unit and a first differential planetary gear unit; and a joint unit;

wherein an input rotational power from a drive unit is divided into at least a first output rotational power and a second output rotational power by said dividing unit or said first differential planetary gear unit, wherein said second output rotational power is input to said joint unit, wherein said second output rotational power is smaller than the first output rotational power, and wherein said joint unit comprises an electric motor and a second differential planetary gear unit.

5. A transmission apparatus according to claim 4, wherein rotational power from a drive unit is transmitted to a single input shaft of said first differential planetary gear unit;

wherein a first output shaft of said first differential planetary gear unit is connected to a first input shaft of a converging unit; and wherein a second output shaft of said first differential planetary gear unit is connected to a second input shaft of said converging unit via said second differential planetary gear unit.

6. A transmission apparatus according to claim 4, wherein said transmission apparatus comprises both said dividing unit and said first differential planetary gear unit;

wherein an input rotational power input from said drive unit is transmitted to said dividing unit via a single input shaft of said dividing unit and is output from said dividing unit to a first rotating shaft and a second rotating shaft;

wherein said first rotating shaft is connected to a first input shaft of said first differential planetary gear unit; and wherein said second rotating shaft is connected to a second input shaft of said first differential planetary gear unit.

* * * * *